United States Patent [19]
Cooper et al.

[11] Patent Number: 5,920,842
[45] Date of Patent: Jul. 6, 1999

[54] SIGNAL SYNCHRONIZATION

[75] Inventors: J. Carl Cooper, Monte Sereno; Steve Anderson, Cupertino, both of Calif.

[73] Assignee: Pixel Instruments, Los Gatos, Calif.

[21] Appl. No.: 08/322,069

[22] Filed: Oct. 12, 1994

[51] Int. Cl.⁶ .............................. G10L 3/02; G10L 9/00; H04N 5/04

[52] U.S. Cl. ........................ 704/503; 704/211; 348/512

[58] Field of Search .................... 395/2.14, 2.16, 395/2.2, 2.76, 2.77, 2.91, 2.92, 2.93, 2.94–2.95; 348/512

[56] References Cited

U.S. PATENT DOCUMENTS

| | | | |
|---|---|---|---|
| 4,406,001 | 9/1983 | Klasco et al. | 369/88 |
| 4,851,909 | 7/1989 | Noske et al. | 348/512 |
| 5,323,272 | 6/1994 | Klingler | 360/8 |

*Primary Examiner*—David R. Hudspeth
*Assistant Examiner*—Patrick N. Edouard
*Attorney, Agent, or Firm*—Lightbody & Lucas

[57] ABSTRACT

An apparatus and method is disclosed for converting an input signal having frequency related information sustained over a first duration of time into an output signal sustained over a second duration of time at substantially the same first frequency by adding or subtracting to the effective wave length of the output signal. Preferably, the signals are converted in digital form with samples added or subtracted to frequency convert the signal.

34 Claims, 13 Drawing Sheets

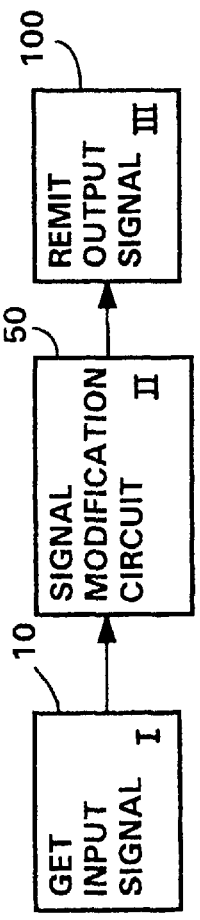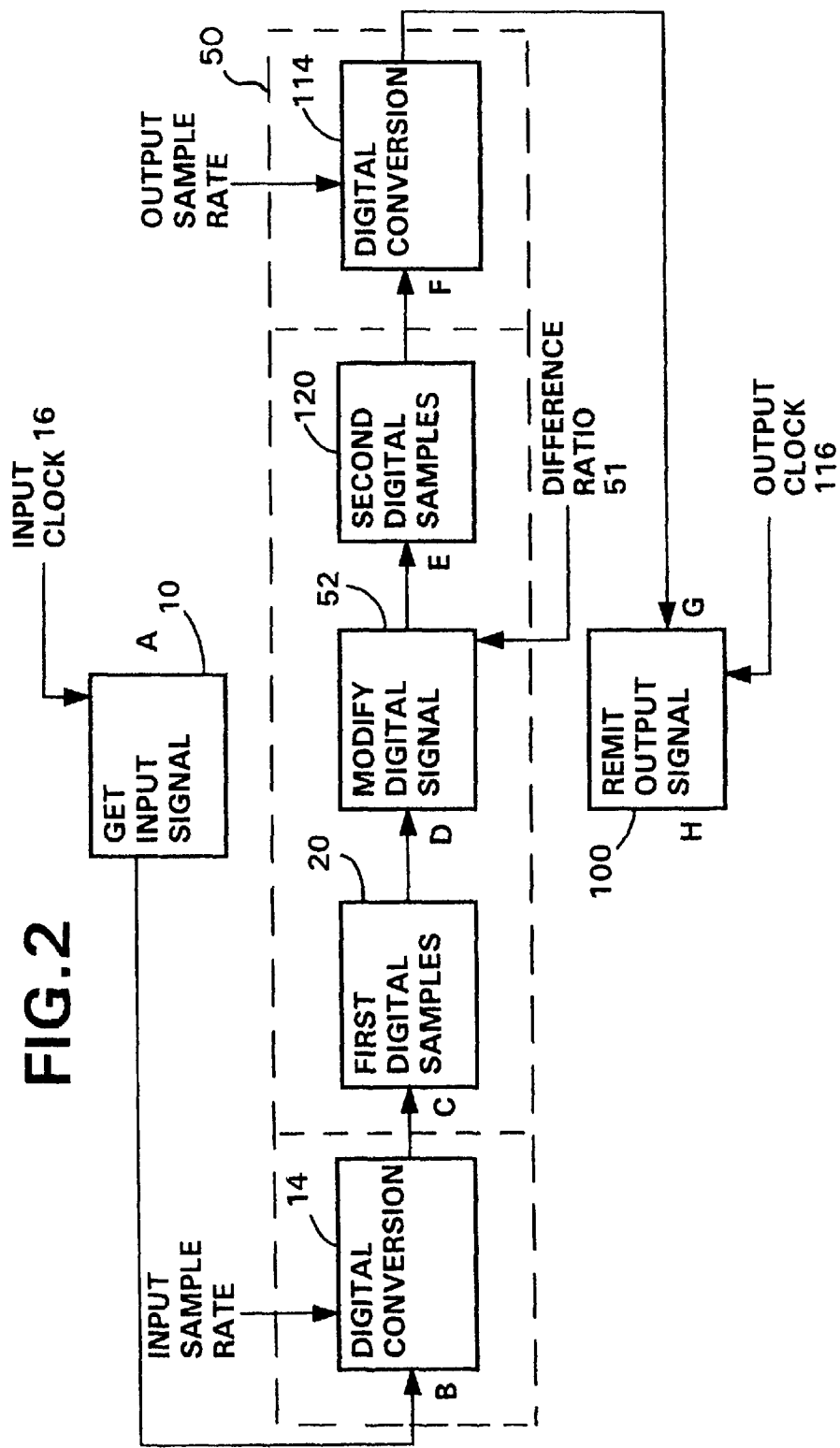

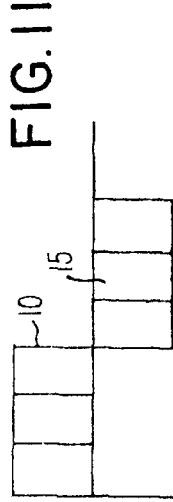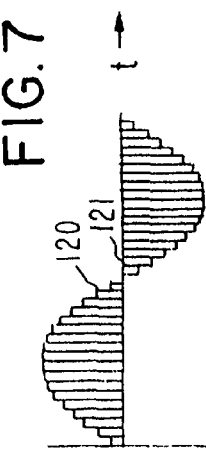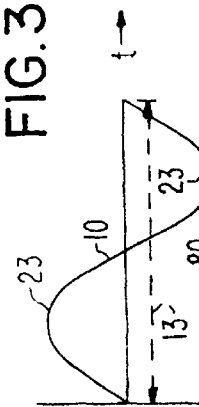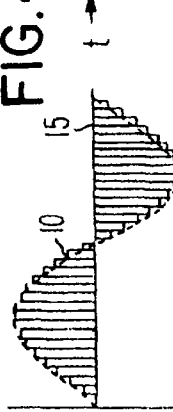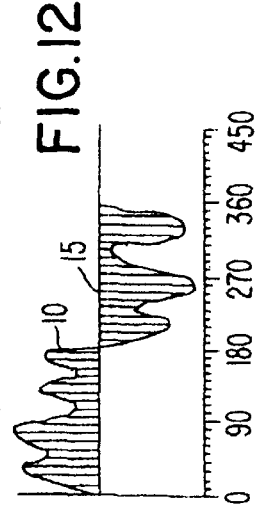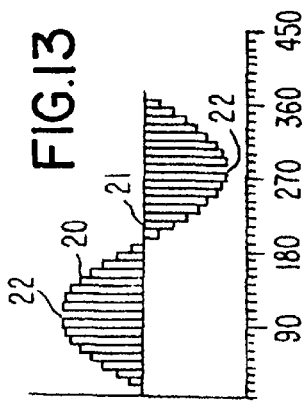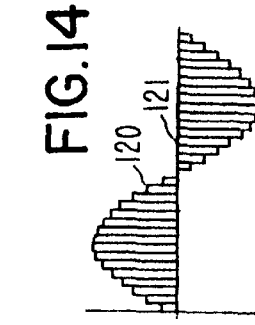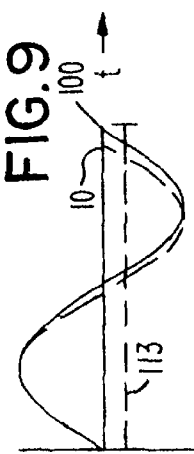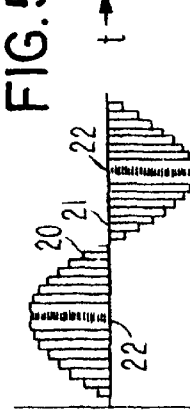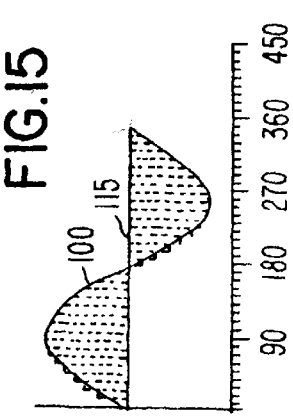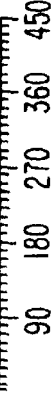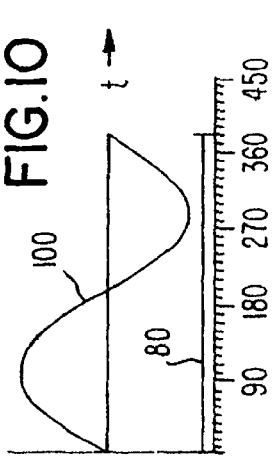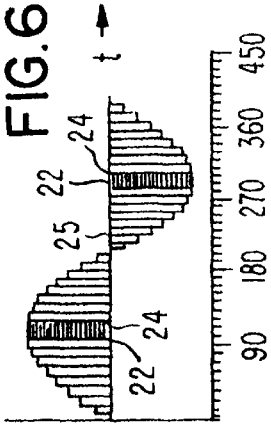

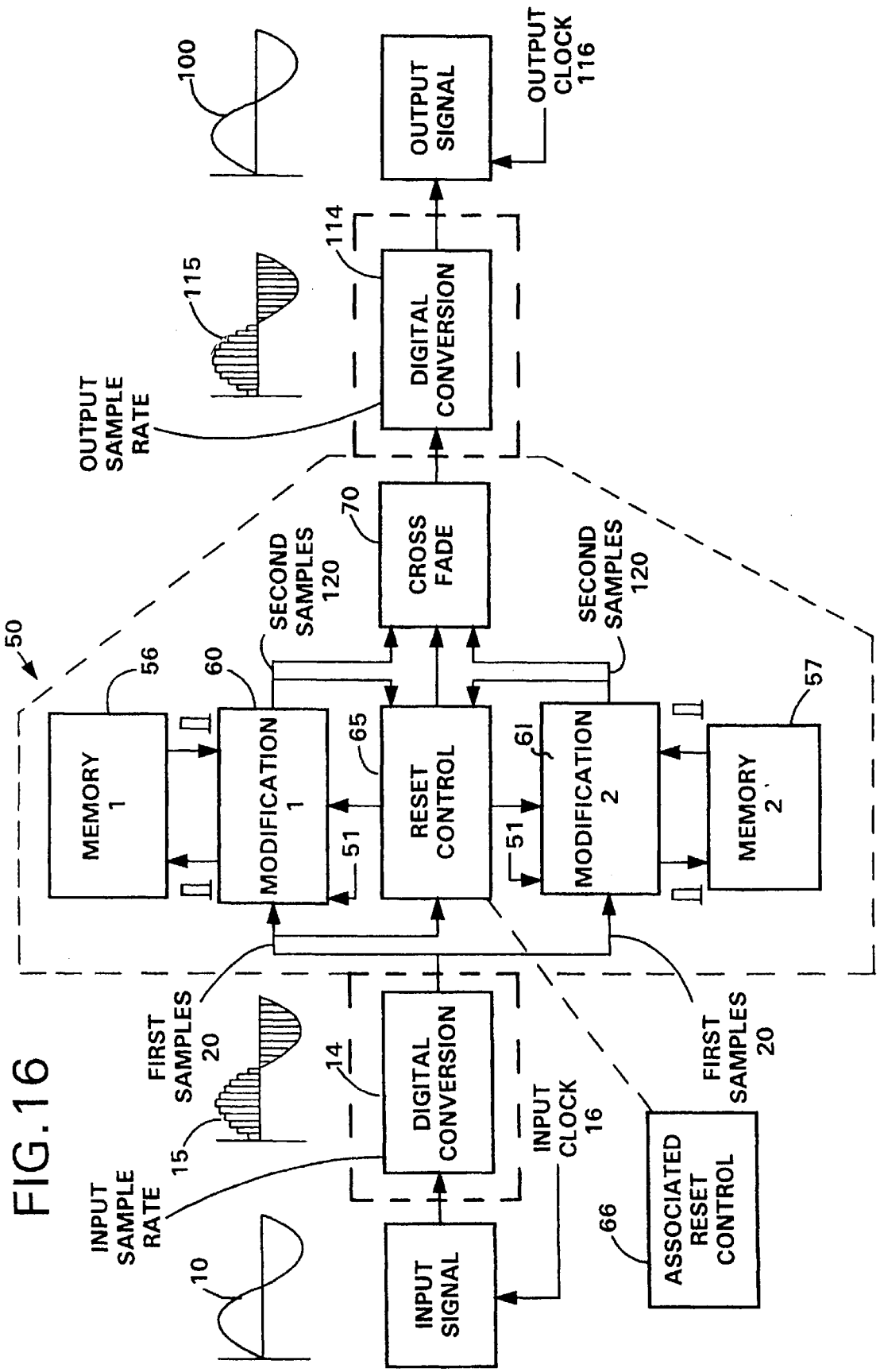

SIGNAL SYNCHRONIZATION

FIELD OF THE INVENTION

This invention relates to frequency conversion and more particularly to an apparatus and a method for converting an input signal having frequency related information sustained over a first length of time into an output signal having substantially the same perceived frequency related information sustained over a second length of time.

BACKGROUND OF THE INVENTION

Various types of frequency converter systems have been known to the prior art. One specific application of such a frequency converter system is the time compression or expansion of an audio, video or computer signal normally stored in some sort of archival system, such as tape, magnetic or optical disk or memory.

If time compression is desired for a stored signal, the stored signal is produced at an increased speed to reduce the total duration of the playback time of the stored signal. Unfortunately, when the stored signal is produced at an increased speed, the signal undergoes an increase in frequency relative to the stored signal being produced at a normal speed.

Conversely, when the stored signal is produced at a decreased speed to expand the signal playback time, the signal undergoes a decrease in frequency relative to the stored signal being produced at a normal speed.

Under either circumstance it would be desirable to provide the ability to change the frequency of the produced signal by a percentage function based on the ratio between the lengths of time of production. Alternately one can change the frequency of a real time signal (i.e., without altering the time period of production).

For example, it might be desirable to replay a prerecorded thirty (30) minute television program in a time duration of twenty-eight (28) minutes in order to fit an allocated time slot without the associated seven percent (7%) increase in frequency. The replay of a prerecorded thirty (30) minute television program in twenty-eight (28) minutes would allow alternately for the insertion of an extra two (2) minutes of commercials. Unfortunately, a viewer can discern the seven, percent (7%) increase in pitch resulting from an increased speed in the replay of the signal. Alternatively, a taped show may run only 45 minutes, with the station having a 50 minute time slot. The present invention allows the show to be expanded to fit the time slot.

In another example, entertainment or educational programs or movies could be presented in shorter time to reduce the operating costs of a movie theater or to allow more movies to be shown in a evening. A similar advantage could be realized in the replay of prerecorded music or voice on a radio station. Messages from an answering machine could be accelerated, perhaps greatly, for rapid playback while retaining normal voice frequencies. Again, the present invention removes the pitch shift artifacts that would otherwise be ascertainable to the consumer.

A further example, some live talk shows have a six (6) second profanity dump memory (that allows the selective deletion of expletives). Some of these dumps, however, also can produce an audio gap after the expletive is deleted due to the need to fill up their memory line with new audio information. The present invention allows for an effective instantaneous switch back to live audio, since delay can be gradually re-accumulated without pitch change.

Another example would be to change the relative pitch of the human voice so as to allow an individual to sing harmony with themselves in real time.

Another example would be to lower the occupied bandwidth of a signal to be transmitted over a radio propagation or other transmission medium.

A last example wherein data may be fed in to a memory, perhaps intermittently, at one speed and fed out at a second (normally slower and perhaps constant) speed, thus facilitating computer operation or elementary data operations.

Some in the prior art have attempted to develop a frequency converter system with varying degrees of success. Although some of these frequency converter systems functioned properly, many of these frequency converter systems were excessively complex and costly to manufacture. Accordingly, the frequency converter systems of the past have not found wide use in the media art.

Frequency converter systems of the prior art include U.S. Pat. No. 4,829,257 to J. Carl Cooper for an improved device for accurately phase or frequency shifting an input signal. This invention incorporated a variable resistor extending between at least two known phase shifted values of the input signal. U.S. Pat. No. 4,868,428 to J. Carl Cooper discloses an apparatus and method for accurately shifting the phase or frequency of a complex signal. U.S. Pat. No. 5,097,218 to J. Carl Cooper discloses an apparatus and method for accurately multiplying the phase or frequency of complex time varying signals by a given factor which may be non-integer.

OBJECTS AND SUMMARY OF THE INVENTION

Therefore, it is an object of the present invention to provide an improved apparatus and method for frequency conversion with reduced complexity of manufacture and operation.

Another object of the present invention is to provide an improved apparatus and method for frequency conversion incorporating a linear interpolator for reducing harmonic and/or other distortion.

Another object of the present invention is to provide an improved apparatus and method for frequency conversion capable of decreasing or increasing the time base of a signal without a significant change in frequency.

Another object of the present invention is to provide an improved apparatus and method for frequency conversion capable of a significant decrease or increase of the time base of a signal without significant change in perceptible frequency.

An additional object of the present invention is to allow real time frequency shifting of an input signal, for example, musical instrument or human voice.

Another object of the present invention is to provide an improved apparatus and method for frequency conversion capable of use with a computer based storage and retrieval system of prerecorded programs or information.

A further object of the present invention is to increase the reproduction utilization capabilities of video and audio recorders, movies and films, answering machines, voice mail boxes, and other signal storage systems.

Another object of the present invention is to provide an improved apparatus and method for frequency conversion with superior overall performance heretofore unknown.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description, taken in conjunction with the accompanying drawings wherein:

FIG. 1 is a block diagram of the theory of the invention;

FIG. 2 is a block diagram illustrating an improved frequency converter system of the present invention connected to an example input signal having a first frequency sustained for a first length of time for generating an example output signal having substantially the same first frequency sustained for a second length of time;

FIG. 3 is a graph illustrating a single cycle of all example input analog signal at a first frequency;

FIG. 4 is a graph illustrating a translation of the single cycle of the input analog signal of FIG. 3 into digital form;

FIG. 5 is a graph illustrating the selection of a digital sample for the signal of FIG. 4;

FIG. 6 is a graph illustrating the addition of a duplicate of the selected digital sample from the samples of FIG. 5 to provide a sample digital form of a modified output signal;

FIG. 7 is a graph illustrating a type of linear interpolation of the signals of FIG. 6;

FIG. 8 is a graph illustrating a transformation of the digital samples of FIG. 7 into an output analog signal;

FIG. 9 is a graph comparing a single cycle of the input signal of FIG. 3 and the output signal of FIG. 8;

FIG. 10 is a graph setting forth the output signal of FIG. 8 as actually perceived by the consumer due to its production at a higher reproduction rate than the input signal of FIG. 3;

FIGS. 11–12 are drawings demonstrating the sampling and nature of signals;

FIGS. 13–15 are figures like FIGS. 6–8 showing an example deletion of a digital sample;

FIG. 16 is a detailed block diagram of a frequency converter system;

DETAILED DESCRIPTION OF THE INVENTION

Figure 17:
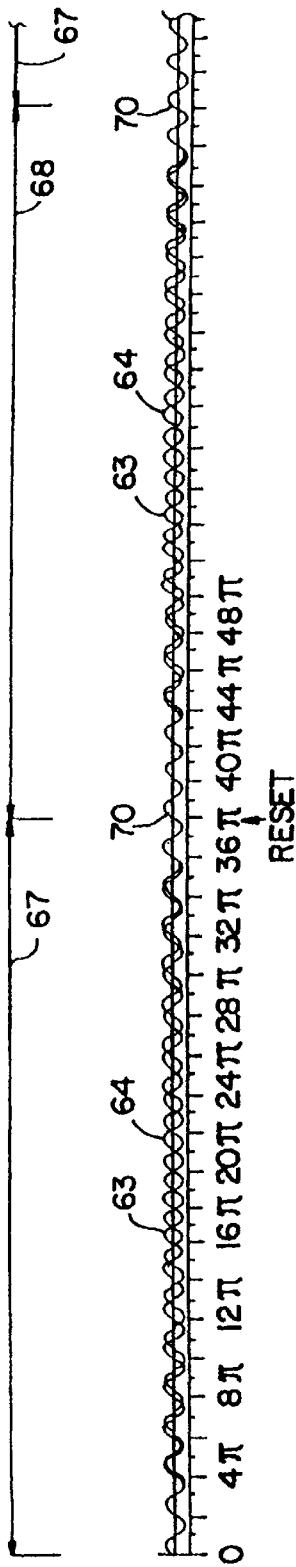
FIG. 17 is a graph comparing a first signal and a second signal and illustrating the reset of the phase angle of the signals at a common zero cross-over.

The present invention is directed to a conversion system and devices that incorporate it, which conversion system can convert an input signal having frequency related information normally sustained over a first length of time into an output signal having substantially the same perceived frequency related information, with the information now normally sustained over a second length of time alternately just frequency, and/or frequency and length of time can be modified. The theory behind this operation is shown in the FIGURES, including FIG. 1.

The theory behind the invention involves getting an input signal 10 (Block I). This signal has frequency based information sustained over a period of time. This input signal 10 is provided to a signal modification circuit 50 (Block II). The signal modification circuit 50 adds or subtracts samples 15 to or from the input signal 10 according to certain principles, mathematical principles normally based primarily on the ratio of frequency and/or time between the input 10 and output 100 signals and the complexity of the signals. The signal modification circuit 50 then remits an output signal 100 (Block III), which output signal 100 has a relationship to the input signal 10 as set by the certain mathematical principles.

One skilled in the art should recognize that the devices disclosed in this application could alter frequency over the same length of time, alter frequency and length of time, and otherwise function. The easiest way to do this would be by altering sample and/or clock rates. For uniformity, this application will primarily utilize as an example devices producing an output signal that perceptibly has the same frequency related information as the input signal 10 and may also be sustained over a different length of time.

In this operation, both the input 10 and output 100 signals have frequency related information on them. The output 100 signal can be either expanded or compressed relative to the. input signal 10. The signals themselves can be audio, television, computer signals, or other signals having frequency related information thereon. Further, the devices can be used in singular form (for example a television video signal), paired form (for example right and left stereo audio signals), or in other combinations including synchronizing the output signal to a related signal (for example synchronizing audio to video). The signals themselves can be in analog or digital form. A digital form is presently preferred in that technology is presently more established for digital processing of complex wave forms. However, with the increasing advances in analog circuitry including the use of charged coupled devices (CCD's), it is envisioned that soon analog processors may be able to process the complex signals as well and perhaps better.

The digital signals may be coded in pulse code modulation (PCM), pulse width modulation (PWM), pulse length modulation (PLM), pulse density modulation (PDM), pulse amplitude modulation (PAM), pulse position modulation (PPM), pulse number modulation (PNM), pulse frequency modulation (PFM), pulse interval modulation (PIM), or other coding scheme. Pulse amplitude modulation will be utilized in the explanation of the invention.

The location of the signal modification circuit 50 in the overall replication path is not critical. In most instances, the signal modification circuit 50 would be located after some sort of signal storage means for modification of the stored signal. This is generally preferred in that the stored signal would contain the highest quality signal. Such stored signal could also be otherwise used. However, the signal modification circuit 50 could be located prior to the storage means or even within such storage means. The circuit 50 could also operate in real time. Further, the order of the conversion steps are not critical as long as all steps are accomplished.

For example, the clocking shift and analog to digital conversion could occur prior to real time signal modification in the overall frequency conversion of an analog signal. An example of this would be playing an answering machine at high speeds with subsequent real time frequency conversion to lower the voice pitch to normal values. Further example in FIG. 2 the storage means could be located before/after or between any of the blocks of circuitry at points A–H respectively. The operation of the invention is thus also not dependent on a storage location.

FIG. 2 is a block diagram of the signal modification circuit 50 receiving an input signal 10 sustained over a first length of time 13 at a first ascertainable frequency. In real time this length of time 13 would be the period of production of the input signal 10. As the signal 10 utilized as a uniform example in this specification is an analog signal, a digital converter 14 converts the input analog signal 10 into a digitally sampled version 20 of the input analog signal 10 (if the input signal 10 was itself digital or already a digitally sampled version of an analog signal, no conversion would normally be necessary; oversampling however, might be appropriate. The inclusion of the converter 14 in the modification circuit 50 is thus dependent on the nature of the processed signals).

In the particular circuitry example of the figures, the input signal 10 is an analog signal having an alpha length 13. Here, applicant defines alpha length as the time duration of a contiguous signal block, exclusive of any reset operations (reset operations will be addressed in detail below). This input signal 10 is normally replicated over a certain time period, a period normally directly related to the alpha length. The input signal 10 normally exists for reproduction over a certain set length of time, a time length analogous to inverse clock rate including real time.

In FIGS. 2 and 16, input clock refers to the speed of production or reproduction of the input signal. The input sample rate refers to the rate at which discrete-time samples are presented to the signal modification circuit. The input clock and input sample rate may or may not be related. For example, if the input source is an analog tape player, the input clock would refer to the speed of the tape. Tape speed might be variable, while the input sample rate may or may not be variable. As another example, the input source may be a compact disk player outputting digital samples at a 44.1 kHz rate. In this case, no continuous-time to discrete-time conversion is necessary. If no sample rate conversion was used, the input sample rate would here be the same as the input clock rate. If the speed of playback of the compact disk was varied, then both the input clock and input sample rate would vary. The output sample rate is the rate at which discrete-time samples are output from the signal modification circuit. It may or may not be equal to the input sample rate. The output clock rate refers to the speed of production of the output signal, and may or may not be related to the output sample rate.

The input signal 10 is normally preferably fed into a digital converter 14 in order to replicate such input signal 10 in digital samples 15. The nature and rate of the digital sampling is selected in accord with the overall circuitry design. Examples of the type of digital sampling that can be utilized have been previously set forth. For uniformity, the preferred embodiment of the invention will be set forth with pulse amplitude modulation (PAM) digital sampling.

It is preferred that the digital coding and/or rate be selected in respect to the nature and frequencies of both the input and output signals. For example, according to the sampling theory, a sampling rate of a little over twice the highest expected frequency will allow for the accurate reproduction of an analog signal with minimal distortion. An example of this is the 44.1 kHz sampling rate for common compact disks. In addition to this, the sampling rate must be selected in order to provide for the compression/expansion of the signal in an accurate manner. This entails a review of the signal content. In specific, if a computer on/off binary signal was involved with a conversion of 3:2, a sampling rate three times the clock speed of the input signal would provide for completely accurate conversion (FIG. 11). However, with an audio signal at the same somewhat extreme example 3:2 reduction, a sampling rate of twice the frequency of the input audio signal (for example a sampling rate of 44.1 kHz) would provide a normally unacceptable result due to the distortion on the output signal 100. The reason for this would be that aliasing would occur if one-third ($\frac{1}{3}$) the samples were removed. It is therefore necessary to sample the audio input signal 10 at a rate much higher than the Nyquist rate in order to provide for an acceptable output signal for the analog signal (FIG. 12). Over and above this restriction, it is preferred that any input signal 10 be sampled at as high a rate as possible, in order that the addition/deletion of individual samples would have a minimal effect on the information available on such input signal 10. For example, the deletion of one out of every ten samples at a 10,000 times over sampling rate would have less artifacts than the deletion of one out of ten samples at a ten times oversampling rate although both provide the same 10 percent (10%) signal compression. The reason for this is that with higher rate sampling, the many artifacts which would be produced would occur at an extremely high frequency, with many occurring at a frequency above that perceptible to the senses of the consumer. The Philip's pulse amplitude modulation at a standard rate of 256 over sampling (256× 44.1 kHz) is a natural sampling technique for the invention in audio applications.

The difference ratio 51 that is input to the actual modification circuit 52 determines the scope and nature of the relationship between the input 10 and output 100 signals. Examples of these relationships have been previously given in the BACKGROUND OF THE INVENTION section. The general concept is that there is an input signal 10 which has frequency related information, which input signal 10 further has some frequency and/or time ratio to the output signal 100, normally a ratio based on the times of expected signal production. If time is the determinant, the difference ratio is selected such that the output signal 100 when perceived has the same frequency related content as the input signal 10. Alternately the output signal 100 may have the same time as the input, but a different frequency or both may be varied simultaneously.

The difference ratio may be defined as the output frequency-time product, divided by the input frequency-time product. For example, suppose that the difference ratio is 0.855. If the input and output times are the same, then the output frequency is 0.855 the input frequency. If the input and output frequencies are the same, then the output time is 0.855 the input time. If the output frequency is 0.95 the input frequency, then the output time would be 0.9 the input time, since 0.95 multiplied by 0.9 equals 0.855.

The difference ratio 51 can be set manually or automatically. An example of the former would be having a technician dial in a factor representative of the input length and then a second factor representative of the output length. This type of manual setting would be particularly appropriate where the technician knew that a thirty (30) minute television program needed to be inserted into a twenty-eight (28) minute time slot. As an example of the automatic setting, in television signals the horizontal sync pulses could be utilized to automatically decompress a tape recorded television movie. This type of automatic functioning would be particularly appropriate for signals having known, repetitive, determinable attributes or where the function of the circuitry can be readily determined (for example a profanity dump).

In the circuitry of FIGS. 2 and 16, the difference ratio is as previously defined. This ratio has been previously determined by the technician responsible for conversion. Pitch shift may be obtained by sample insertion or deletion, if the input and output sample rates are the same. Alternatively, pitch shift may be obtained by using differing input and output sample rates, without sample insertion or deletion. Additionally, a combination of sample insertion/deletion and differing sample rates may be used. The sample rates preferably are at least greater than the Nyquist rate for both input and output. Over and above this, distortion considerations could require that the input signal be sampled at a rate much higher (for example 20 times) the highest input frequency in order to insure production of the output signal with minimal distortion. Note, however, that in non-critical applications the sampling rates can be much lower, particularly if the signals can be band width limited while retaining acceptable information content (an example of this would be band width limiting an audio signal to 5 kHz).

As shown in FIGS. 3–15, the modification circuit 52 selects at least one sample 22 from the digital sampled version 20 of the input signal 10 and generates a second plurality of digital samples 120 by altering the number of the digital sampled version 20 of the input signal 10 by the selected digital sample(s) 22. This can be by addition to expand (samples 122 in FIGS. 6 and 7) or by subtraction to compress (samples 22 in FIG. 13) as appropriate. The location of the added/deleted samples is selected in view of the signal content so as to minimize artifacts. For very high oversampling rates, the samples can be spread out over the entire alpha length of the signal. For lower oversampling rates, locations of least slope, least differences, signal peaks, or other minimal signal information points are preferred.

Note that FIGS. 3–15 are given by way of example. Other sampling/modification methods could also be utilized with the invention. Note also that for clarity of explanation in these figures that the input sample is converted to digital by a leading edge sample and hold circuit (left edge), while the output sample is converted to analog by a trailing edge conversion circuit (right edge). Alternate conversion circuits could be utilized if desired. For ease of comprehension, no interpolation is used in FIGS. 3–15.

The second plurality of digital samples 120 can be interpolated to reduce distortion caused by replication or deletion of the selected digital sample 22 if appropriate. A second digital converter 114 then generates an output signal 100 from the second plurality of digital samples 120 over the second duration of time 113 (again the inclusion of this convertor is dependent on the nature of the output signal). In the example shown, this produces a signal having substantially the same first frequency when clocked or reproduced at the new speed provided that the rate of occurrence of altered samples 22 relative to the input sample rate corresponds to the ratio between the first 13 and second 113 duration times. compare the analog input signal 10 of FIG. 3 with the output analog signal 100 of FIG. 10, which output signal 100 is being produced during a different, shorter, length of time: In real time 80, the perceived frequencies or alpha length of the signals are the same. In this respect, it is noted that minor unobjectionable shifts could be accepted by the overseeing technician, this even though the pitch of the resultant signal is not absolutely accurate. Alternately the output may have a different frequency and same duration or a combination of different frequency and duration.

It should again be appreciated by those skilled in the art that either the digital converter 14 or the digital converter 114 may be optional in the event that either the input signal 10 or the output signal 100 is a digital signal of suitable signal content to allow for acceptable modification. Otherwise, oversampling would normally be appropriate.

The selected digital sample(s) 22 is added (FIG. 6) to the sampled version 20 of the input signal 10 to provide pitch correction to facilitate the prior or subsequent decrease of the duration time. The selected digital sample(s) 22 is removed (FIG. 13) from the sampled version 20 of the input signal 10 to provide pitch correction to facilitate the prior or subsequent increase of the duration time. This will be discussed more extensively later, especially with respect to FIGS. 16–18.

The signal modification circuit 50 adds or subtracts to the apparent alpha length of the input signal 10 according to the difference ratio in order to produce the output signal 100.

With present digital technology, this signal modification circuit 50 would begin with digital signals or a digital sampling replication 15 of an analog signal. This signal modification circuit 50 then repeats (to add or expand) or deletes (to subtract or compress) from these samples in order to alter the input signal 10 to an output signal 100 in accord with the set difference ratio. (Note again that a digital signal might, like an analog signal, have to be digitally over sampled to achieve acceptable distortion performance.)

A more sophisticated signal modification circuit 50 could average or linearly or otherwise interpolate the modified samples in order to optimize the functioning of the device in certain applications.

For example, a theoretical analysis of the spectrum resulting from applying a 5.6 percent expansion to a sine wave was performed. The sine wave period was 36 samples. The purpose of the analysis was to determine the relative distortion levels resulting from the insertion of samples at different phases of the input sine wave. Two samples per period were inserted. The type of linear interpolation used in the preferred embodiment is essentially the second-order approximation method used for sample rate conversion. Proakis, John G., Rader, Charles M., Ling, Fuyun, and Nikias, Chrysostomos L., *Advanced Digital Signal Processing*, Macmillen, 1992. This particular interpolation operates along the entire signal, and weighs two adjacent samples in proportion to the distance from the last sample insertion. This type of interpolation gives exact (within quantification limits) output: in the case of a linear ramp signal with constant slope (zero second difference). Three insertion points were examined: peaks, zero crossing, and 30° lagging from zero crossing. Insertion of samples at the zero crossing resulted in the lowest distortion of the three. Insertion of samples at the peaks was slightly inferior to the zero crossing. Insertion of samples at the 30° points resulted in the highest distortion. A feature of the zero crossing point of a sine wave is that it is the location of minimum second difference magnitude. A feature of the positive and negative peaks of a sine wave is that they are the location of minimum slope, or minimum first difference, magnitude. A feature of points on the sine wave which are removed from the peaks or zero crossings, such as the 30° phase point, is that neither the first or second difference is minimized.

Sample insertion at the peaks and at the zero crossings was also investigated for the case of no interpolation. In this case, insertion at the peaks gave lower distortion. Distortion performance in both cases was significantly worse than that obtained where interpolation was used.

It is envisioned that other interpolation algorithms may be advantageous from a performance standpoint. Examples of other algorithms would be polyphase subfiltering, higher order Lagrange polynomial interpolation, and finite impulse response low-pass filtering. In the case of expansion, it may also be advantageous for the added sample to be of some value other than the value of the immediately preceding sample.

Customarily, the signal modification circuit 50 would. contain a delay length preferably of the variable type, the length of which must at least allow for the appropriate shifting of the signals to add or subtract whole cycles. Specifically, the maximum shift between the input signal 10 and the output signal 100 should be within the effective delay length of the available memory. Further, to provide for a smooth output signal 100, the present invention preferably uses a memory delay longer than this period in order to provide for a seamless operation.

The present invention accomplishes this with less than the amount of memory otherwise needed by comparing a first and second signal in order to reset the information in the memory (as later described) to add or delete blocks or cycles thus to provide for a seamless integration of the signals. In general, the more memory that is available, the more time can pass before the device is reset subject to an ascertainable artifact override. For complex audio signals, up to a point, the quicker the resetting; normally the less ascertainable the artifacts as will be described in more detail below. In addition, an even greater memory would allow an operator to delete or add blocks, cycles, or multiple cycles of signal information with no pitch change.

The delay could be a single memory if variable taps were available and the signal was actively followed through such variable taps by the signal modification circuit 50. Changing over between effectively two separate memory delay lengths 56, 57 is preferred, which delay lengths are each long enough to provide for the later described resetting, because of the way the design evolved. A single memory delay element was originally used. Later, a second memory delay element was added, since this was, at the time, the easiest way to accommodate the needed later described cross fade reset operation. At any given time, exclusive of reset operations, one memory circuit would be actively utilized in real time by the signal modification circuit, while the other memory preferably would continue to be updated with input signal data. An example of this is the two stretch cell embodiments set forth in FIGS. 20 and 21.

Figure 20A:
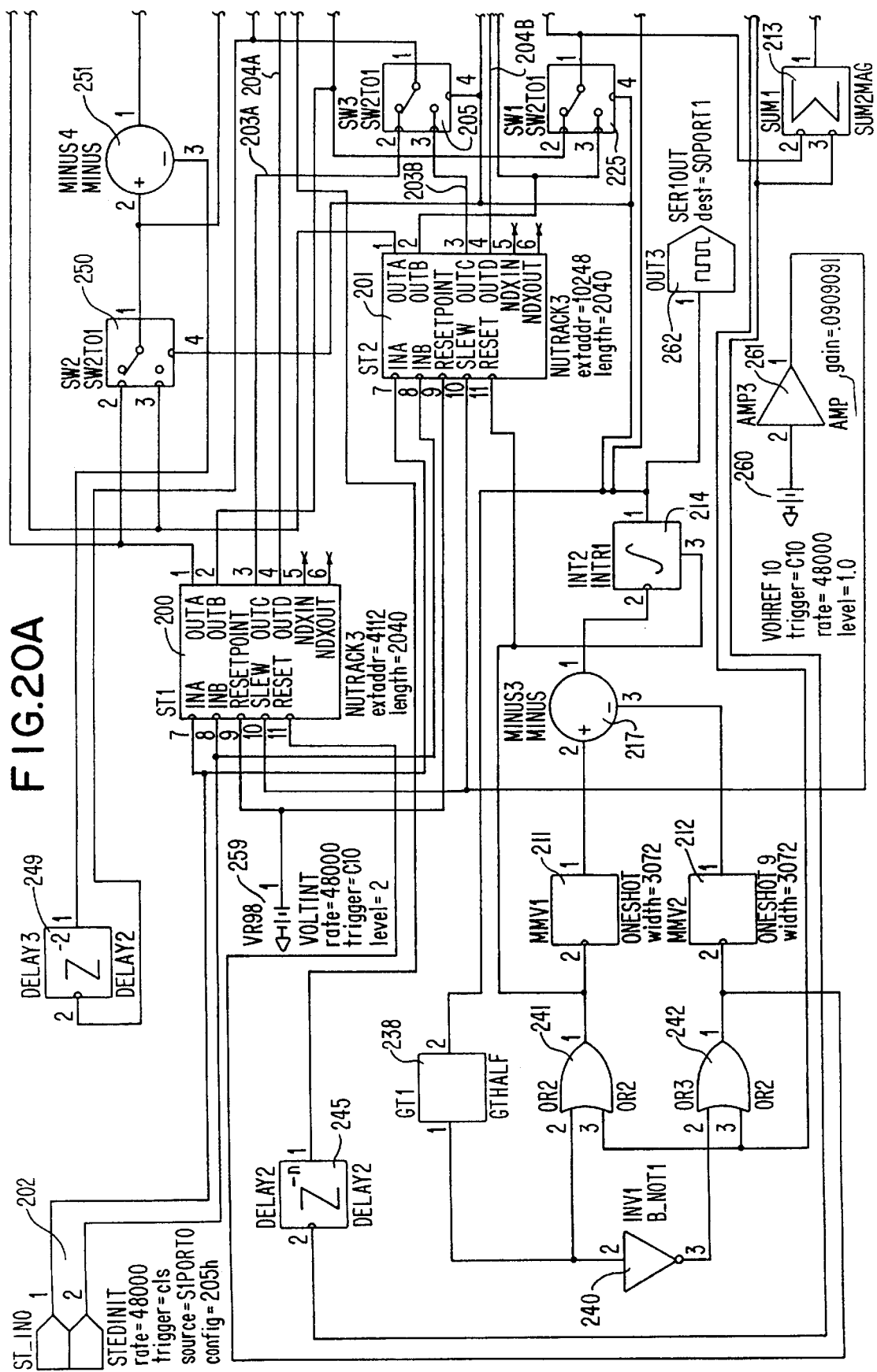
FIGS. 20–21 are circuit diagrams of example frequency converter systems.
Figure 20B:
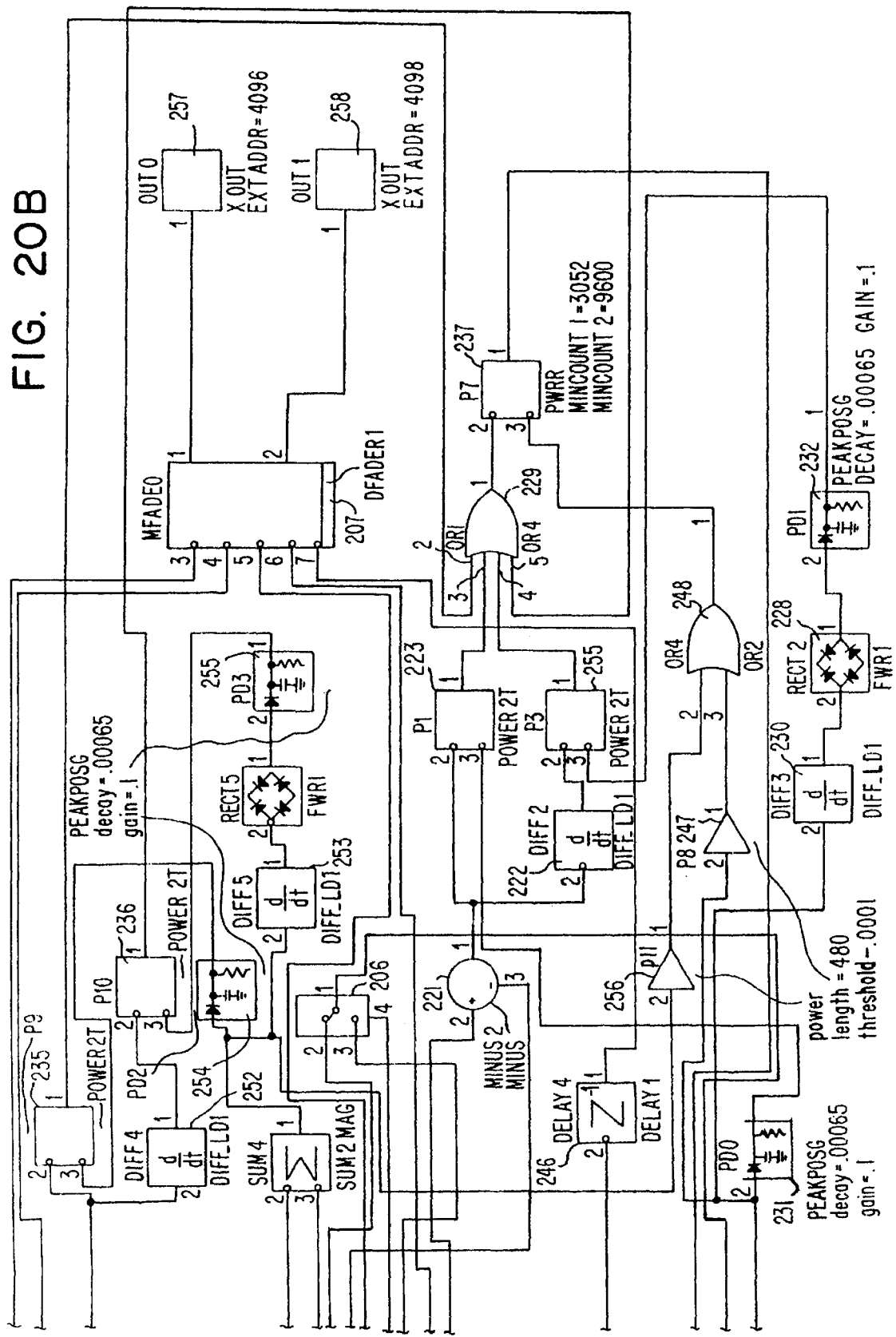
Figure 21A:
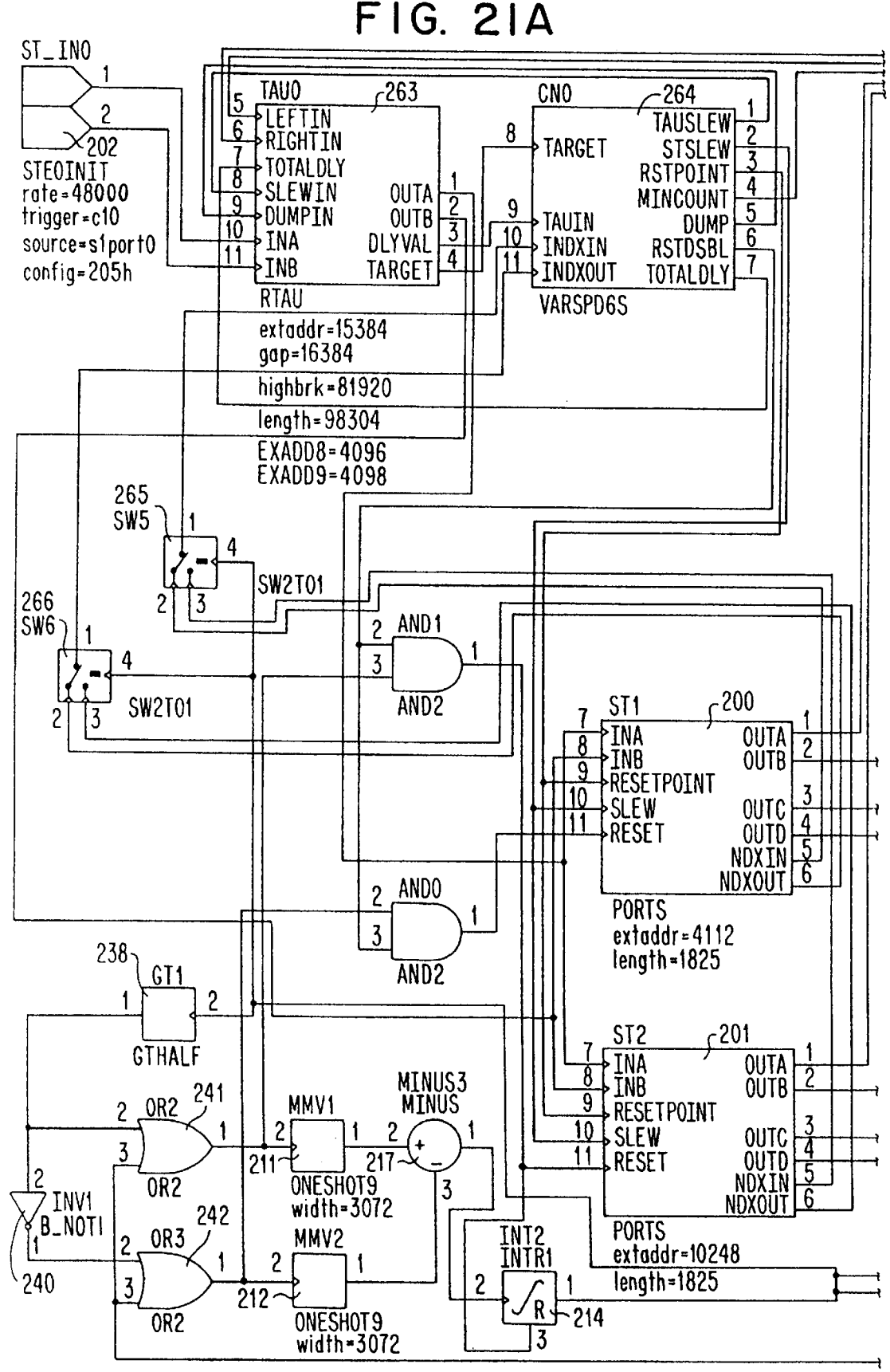
Figure 21B:
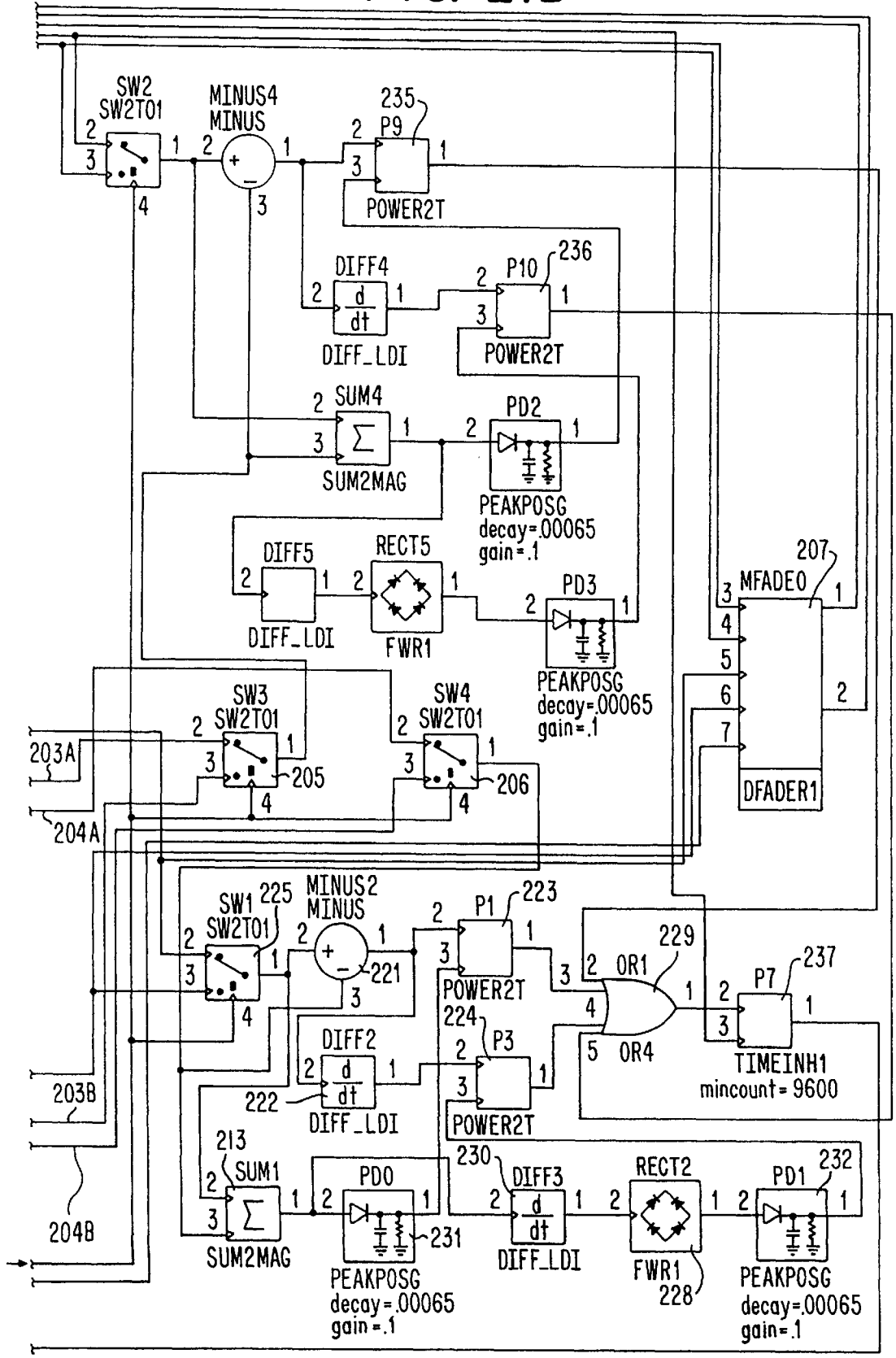

The circuitry of FIGS. 16 and 20–21 include two effective memory lines 56 and 57 together with two modification circuits 60 and 61. FIG. 16 utilizes two separate RAM memories while FIGS. 20 and 21 utilize a single RAM memory, with two different address spaces allocated respectively to two stretch cells to allow resetting.

The memory lines 56, 57 are preferably RAM memory circuits. These circuits provide for a delay necessary for the processing to occur. The length of these memory circuits is chosen in order to optimize the performance of the overall circuitry while at the same time preferably minimizing expense. The selection of length is normally a compromise between excessive delay versus the ascertainable artifacts which might occur during resetting at an earlier than appropriate time or resetting at too high a rate. In general, changing over more quickly reduces information loss. However, changing over too quickly results in unacceptable artifacts, so a compromise is chosen. Also, in general, optimization of performance is determinative of the preferable length for the memories 56, 57, even though theoretically an infinite memory length could be used. (Too long a delay can produce noticeable gap and/or echo effects. It also violates EIA/TIA-250-C.) Due to the use of two memory lines, and the changing therebetween (as later described), memory lengths of from 38 mS to 149 mS are more than sufficient for a normal audio signal. This memory is sufficiently long to allow for the smooth crossover between memories 56, 57 while at the same time storing sufficient samples so as to support the typically experienced maximum time between crossovers. Note that the length of the memory is a design choice. For example, there are frequent times of audio silence in a television talk show. If the memory was sufficiently long as a function of the expected length between silences in audio content, and the duration of the silence was at least as long as the section of memory to be traversed by the reset, the memory could be reset during these times of silence, thus not dumping or repeating any audio information. The length of memory required is the expected length between silences multiplied by the conversion factor. For example, for 0.4 seconds between silences at ten percent expansion or compression, 40 mS of memory is typically required. Further example in a symphony orchestra a memory technically long enough to work may produce artifacts due to too frequent resets. A longer memory accompanied by a reset prevention control would therefore be used, preferably delaying resetting to a time of silence or otherwise when least artifacts would occur. An additional example would be with television video content wherein there are frequent times of static images and/or screen changes. These can be located with a motion detector. By adding or deleting frames thus changing over video during these times, video artifacts are reduced to a minimum. Further, if the signals of any nature are compressed or expanded prior to signal modification and the sampling rate is high enough, and acceptable reset opportunities occur with sufficient frequency, conversion can occur with low average throughput delay. It is, therefore, important to recognize that the invention can be optimized for a given signal by slightly altering its specific implementation.

The modification circuits 60, 61 add or subtract samples to the signals contained within the memories 56, 57, respectively. This modification of the samples can occur while the samples are being fed into the memories 56, 57, while they are being removed from the memories, or otherwise.

As previously described, the rate of digital sampling is normally dependent on the complexity and frequency of the signals. In general, the more complex the signal and/or the more this conversion ratio is removed from unity, the more samples will be needed. The reason for this is that using too few samples in a complex, high frequency conversion will result in excessive distortion. For example with a 30 Mhz computer square wave high/low input signal, three samples per clock period would be sufficient to slow the signal down to 20 Mhz (see FIG. 11). However, with a 20 kHz audio signal, a sample rate much higher relative to signal frequency would be necessary to provide a 5 percent expansion without audible artifacts (see representative FIG. 12). This is because the information content of the computer signal is accurately conveyed solely by the on/off state. Thus the digital sampling rate must be carefully selected in view of the signals, both input 10 and output 100, as well as the difference ratio 51 to be encountered.

Changing over between the signal of the first memory 56 and the signal of the second memory 57 is accomplished by a reset control 65. When the reset control 65 operates, the signal modification circuit 50 changes over to the previously inactive memory circuit to remit the output signal 100. The other once active memory at the same time becomes disconnected from the output. The result is to increase or decrease the effective length of the overall memory.

Note, if samples are taken out of the memory more slowly than they are put in, the delay length will slowly increase to maximum. At maximum delay, there will be no available memory for the next sample to be put into. Conversely, if samples are taken out faster than put in, the delay will shorten to nothing. At zero delay, there will be no stored sample to be taken out. It thus is desired to reset the memories before they are full or empty respectively, and preferably so that whole cycles of signal are added or deleted. By resetting or changing over memories, a portion of the signal will be repeated, preferably an integral cycle, or a portion of the signal will be lost, again preferably an integral cycle. The net gain in either case, however, is to vastly increase the amount of apparent memory.

The reset control 65 operates by comparing two signals in order to determine their similarity, with the changing over between the signals in memory occurring based on this similarity. The purpose of the reset control 65 is to maintain the overall throughput delay within acceptable limits. The signals being compared typically should include a delayed signal and another signal, which may itself be also delayed or not. For example, in a compression circuit, samples are being removed and a signal is effectively output from memory faster than it is being input. For this reason, the reset point could be at maximum delay or at the end of the memory. A delayed signal at this point is then compared to the relatively undelayed signal that is being used by the modification circuit for changeover to maximum delay. However, in an expansion circuit, samples are being added and a signal is effectively output from memory more slowly than it is being input. For this reason, the reset point could be at minimum delay, or at the beginning of the memory. A relatively undelayed signal at this point (which could even be the input signal) is then compared to a relatively delayed signal that is being used by the modification circuit for changeover to minimum delay. As an additional example, the reset control 65 could be a computer that has as a signal feed of only the input signal, which the computer compares with time shifted versions of such signal to operate this reset control 65 through analytical analysis, essentially comparing two versions of the single input signal for similarity; this with no other direct connection to any signal modification circuit signal input or output. As a further example, the reset control could be a computer that compares a plurality of signals over a range at one end of a memory with a second plurality of signals over a range at the other end of a memory, with the reset occurring between the two most similar signals. In this device, the signals being compared would be developed from an analysis of a plurality of signals. While the resulting reset might not produce the maximum amount of available memory (i.e., be to the end of the memory), complex signals would be effectively processed. Therefore, depending on circuit design, the signals compared for similarity may vary from that disclosed herein. The key is that the signals have a statistical probability of being similar and are representative of signals displaced from each other in the memory. For example, the reset control could compare: a) the signal at the output of one memory 56, 57 to the input of the other memory 56, 57; b) the output 100 to the input 10; or, c) otherwise as desired or appropriate. In the preferred expansion embodiment of this specification, the input signal and output from the active memory are compared. In the preferred compression embodiment, the output from the active memory and the signal delayed relative to this output are compared.

The reset control 65 in ascertaining similarity, preferably, compares the signals for: a) relative slope between signals; and, b) relative amplitude between signals. These are compared to preset thresholds. Signals meeting the criteria of low relative slope and amplitude include periods of no information (i.e., silence in audio). Video signals could be compared for scene change points for the addition/deletion of frames in a video image in an alternative embodiment. Video, signals could also be compared for static video images, in an alternative embodiment.

The Algorithms used to extract signal comparison information must be selected consistent with the type of coding used.

It is preferred that the compared signals be examined for similarity in as many characteristics as practical. For example, the use of zero crossover in a similar direction alone in a reset control could produce an artifact if one signal was a high frequency signal at that point while the other was a low frequency signal. Similarly, least relative slope alone could cause unacceptable artifacts to critical listeners of an orchestra if resetting occurs more rapidly than is absolutely necessary. Look forward and look back comparisons would thus preferably be utilized in the reset control 65 so as to optimize the overall comparison with time displaced information as well as current signal status. Further, the reset control 65 would preferably include an override in response to these overall comparisons in order to limit unneeded resets, thus optimizing the comparison procedure. In general, the more comparison attributes are included, the better the operation of the reset control 65.

The reset function is often accompanied by a repeat of signal (pitch increase mode; samples added) or discard of signal (pitch decrease mode; samples removed).

Figure 26B:
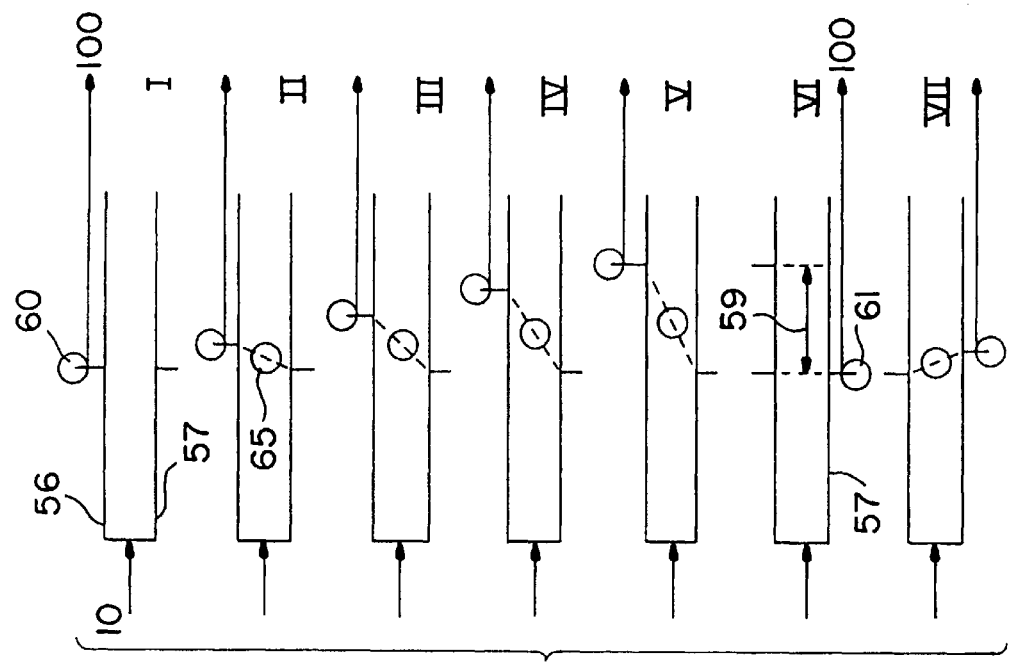
FIG. 26 is a series of representational block diagrams setting forth an example resetting of memory lines in an expansion or contraction frequency conversion device; and, FIG. 27 shows an adaptive filter network for incorporation into the system of FIG. 25.
Figure 26A:
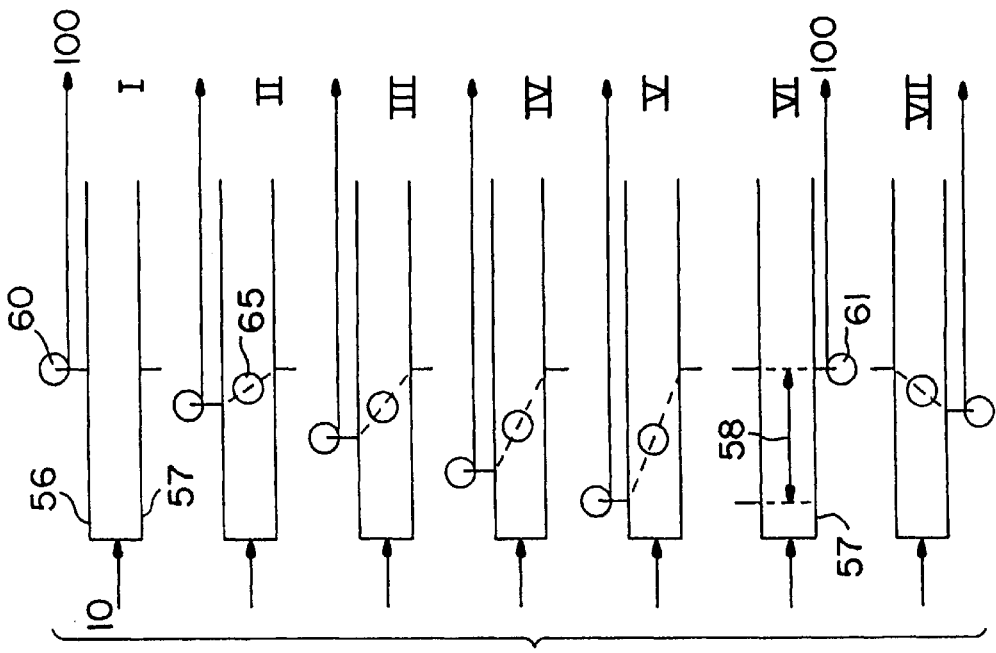

Using an example memory device that is capable of both modes (FIG. 26) with two parallel memory lines 56, 57 and two signal modification circuits 60, 61, the reason for this signal repeat/deletion can be readily understood. In this device, an input signal 10 is being continually fed into the beginning of two RAM memory lines 56, 57.

Figure 19:
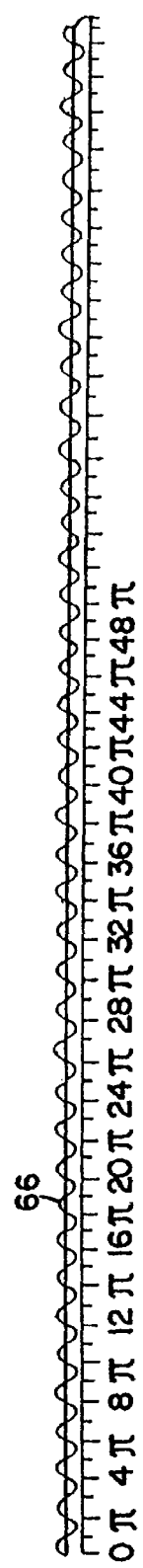
FIG. 19 is a graph of the constant, non-reset first signal in FIGS. 17 and 18.

In the pitch increase mode A, the active signal modification circuit (60 shown) uses signal data at a somewhat faster rate than it is being fed into the memory line 56 (the actual rate dependent on the expansion ratio). This causes the active signal modification circuit 60 to relatively advance up the memory line 56. While this is occurring, the reset control 65 is examining two signals for similarity. In the embodiment shown, the signal being output by the active signal modification circuit 60 and the signal at the circuits reset position are compared (as depicted by dotted lines in all figures). When the signals are similar (or when the active memory line 56 is used up), a reset occurs. This causes the other memory line 57 to return to the relative reset point and other modification circuit 61 to become active. However, since the input signal 10 has been continually fed into both memory lines 56, 57, this reset causes a certain portion 58 of the input signal 10 to be processed for a second time repeating this data at the output of the signal modification circuit 50. As the input signal 10 is periodic, and an integral number of signal periods is repeated, the artifact is acceptable. For example, as shown in the FIGS. 17–19, the actual repeat would normally be one or more complete cycle of the input signal. The actual reset would repeat only a fraction of the actual signal content. In fact, this fraction is typically equal to the compression factor.

In the pitch decrease mode B, the active signal modification circuit (60 shown) uses signal data at a slower rate than it is being fed into the memory line 56. This causes, the active signal modification circuit 60 to relatively retreat: down the memory line 56. While this is occurring, again the reset control 65 is examining two signals for similarity. In the embodiment shown, the signal being utilized by the active signal modification circuit 60 and the signal at the circuits reset or input position (dotted lines in all figures) are compared. When the signals are similar (or when the active memory line 56 is used up), a reset occurs. This causes the other memory line 57 and other modification circuit 61 to become active. However, since the input signal 10 has been continually fed into both memory lines 56, 57, the reset causes a certain portion 59 of the input signal 10 to be never processed, thus deleting this data from the output of the signal modification circuit 50. Again, as the input signal is Periodic, and an integral number of periods is deleted, the artifact is acceptable, especially given the ways described herein of reducing its noticeability.

Note this example uses two memory lines 56, 57 and two modification circuits 60, 61 with a single sample rate for clarity of explanation. In other embodiments, the memory lines 56, 57 could be combined, a single modification circuit could be utilized, only increase or decrease, or both increase and decrease, could be provided in a single circuit, the processing could occur in real time for pitch shifting and other signals could be compared for reset control. Further, the signals in memory could be clocked out at higher or slower rates than being input, thus providing the alteration of the alpha length of the input signal without movement of the signals to the modification circuits (which in both compress and contract could be located at the end of two individually differing clocked memory lines). Examples of these and other embodiments are given here and elsewhere in this application.

The resetting increases or decreases the effective length of the overall memory with acceptable artifacts by changing over between effective memories as previously described.

In the preferred embodiment, when the chosen parameter (s) are similar, the reset control 65 changes over between the relative memories 56, 57 as described. In addition, the previously inactive memory 56, 57 is reset at the time of changeover, thus extending its relative length.

Note that if there are multiple related channels, such as stereo audio or surround sound, this switchover preferably occurs when all important channels are similar at the same time, thus minimizing perceived stereo or spatial phase shift. This reduces the loss of stereo or spatial imaging. This correlation is preferably occasioned by logically connecting each channel associated reset control 66 to the reset control 65 for cooperative signals in order to provide for comparisons of their respective signals similarity.

In addition, in a possible alternative embodiment, if the reset control 65 has not operated near to either end of an operative total memory length, changing over is forced; preferably based on some sort of optimization formula (ideally computerized). This preferable forcing recognizes that a particular memory length may run out of its ability to compensate for the delay between the compared signals prior to the compared signals being similar (as previously set forth), and thus might produce annoying artifacts. Note also that if there are multiple channels (for example again stereo audio), the signals might be forced independently according to individual parameters. One example of this would be if one channel had high frequency (such as a fife), and the other channel had low frequency (such as drums). The optimum forcing times for each respective channel might not be coincidental. In this particular example, the low channel might be forced at a different time from the high channel: if the channels were forced simultaneously, there could be high frequency cancellation and/or loss of imaging. It is therefore appropriate for the forcing to be under the control of some logic specifically designed for the nature of the signals. For example with off/on computer signals, the two channels could be forced independently: Each according to its own parameters. However, for a stereo audio system or for an audio signal synchronized with a video image, care must be taken not to destroy the imaging and/or synchronization. The channels must therefore be correlated to insure that this does not happen.

The circuitry in FIGS. 16 and 20–21 have a reset control 65 which compares the intermediate signals in the modification circuits 60, 61 for similarity with the reset control 65 operating a cross fade control 70 to change over between modification circuits 60, 61.

Note if the length of the delay in the memories 56, 57 was appropriately extended, the changing over could be artificially manipulated including to allow for the deletion or insertion of blocks of information while also reducing the artifacts to a minimal amount. As an example of this, in talk show profanity memories, it would be possible to change over to the inactive memory at the immediate end of the time of the profanity, thus in effect resetting the profanity memory without any additional loss of signal. As an additional example, a documentary could add to or delete audio independently of the video content by increasing or decreasing audio delay without introducing an annoying pitch change. Further, if there is a correlation between two signals, the use of the invention would allow one to independently re-sync the signal's correlation without introducing objectionable artifacts.

An example of how the input 10 and output 100 signals may correlate will now be described in example form. In the embodiment of the invention now specifically described, the input 10 and output 100 will be analog signals with frequency shifting alone occurring.

The input signal 10 is a signal stored for production over a first length of time. This input signal 10 has frequency related information thereon. An example would be a television or audio signal from a video cassette recorder or other storage means. A simplified stylistic version of this input signal 10 is shown in FIG. 3 (in the actual signal, a more complex waveform would normally occur; see FIG. 12 for example). For reasons not particularly important to this example, it is desired to extend this example signal by substantially 5.6 percent without altering the apparent frequency content thereon.

Note that FIGS. 3–15 are given by way of example. Other sampling/modification methods could also be utilized with the invention. Note also that for clarity of explanation in these figures that the input sample is converted to digital by a leading edge sample and hold circuit (left edge), while the output sample is converted to analog by a trailing edge conversion circuit (right edge). Alternate conversion circuits could be utilized if desired. For ease of comprehension, no interpolation is used in FIGS. 3–15.

The first step of this example is to replicate the input signal 10 of FIG. 3 into digital form. In the devices of FIGS.

16 and 19 this is accomplished by a pulse amplitude analog to digital converter 14. An example of this digital sampled signal is shown in FIG. 4. (Although pulse amplitude modulation is shown for this digital example, it is to be understood that other coding methods could be utilized without deviating from the claimed invention. Examples include PWM, PEM, PDM, PCM, PPM, PNM, PFM, PLM, and PIM.)

In this FIG. 4, the analog signal 10 has been replicated into digital form 20 through the use of PAM, specifically thirty-six (36) digital samples 21, each having an amplitude. In that the input signal 10 is to be compressed by 5.6 percent, this 5.6 percent is the equivalent of two samples of our example digital wave 20 of FIG. 4 (it is necessary then to add two digital samples 22 to the input signal 10 in order to frequency compensate such signal). This exemplifies the fact that in the preferred embodiment the sampling rate preferably must be high enough so as to allow the insertion (or deletion) of a sample 21 in the replication of the output signal 100, without introducing unacceptable distortion.

In general, the higher the sampling rate, the less distortion will be introduced by the frequency conversion process. This is particularly true in respect to the frequencies where the consumer is most sensitive. In addition, it is preferred that the samples 20 be inserted (or deleted) where any artifacts would be least noticeable. In the case of a significant expansion (or contraction), the samples would preferably be spread out over the entire length of the wave form (see FIG. 12 for a representative complex wave form).

Our example signal is a sine wave with the samples added at the point of least slope; the peaks 23 of the positive wave and negative wave, respectively. Therefore, needing only two samples, at these two points the signal modification circuit 50 inserts an additional sample 24 in both the positive and negative series of digital samples 21. This produces the modified digital signal 25 of FIG. 6. A modified signal without highlighting is shown in FIG. 7, now representative of the sampling 120 of the output signal 100. Note that FIG. 7 has a peak sample repeated.

When the compressed digital representation of the signal 120 in FIG. 7 is taken through a digital to analog converter 114, the result is the signal shown in FIG. 8, an output signal 100 having an effective alpha length 113 some 5.6 percent longer than the input signal 10 shown in FIG. 3. The difference between the two signals 10, 100 is shown in FIG. 9.

Due to this difference, the output signal 100 can be played back at a clock rate some 5.6 percent higher than the input signal 10 in FIG. 3 while at the same time producing a signal having the same frequency content to the observer as existed in the input signal 10. (Compare FIG. 3, i.e., the input signal 10, with FIG. 10 wherein the output signal 100 is clocked at a rate 5.6 percent higher than FIG. 3: The two signals produce the same frequency content.) This would allow a television station to shorten the time of a television program accordingly without increasing the pitch of the related audio information.

It should be noted that in this example the compression/expansion factor is equal to the inverse of the number of samples between peaks. In the more general case, where such a simple relationship did not exist between waveform period and pitch shift factor, it typically would not necessarily be possible to arbitrarily select the more favorable points for sample insertion or deletion.

It should also be noted that in cases of types of coding differing from the PAM of this example, differing sample modification algorithms may be required.

The difference between our example input 10 and output signal 100 is some 5.6 percent. However, any difference, including this 5.6 percent, is cumulative for each cycle of the input signal 10. For this reason, the memory necessary to perform the function of modifying the input signal 10 into the output signal 100 can be computed by multiplying the number of repetitive cycles by the difference time factor, by 5.6 percent in our example. This adds up very quickly to a significant amount, an amount requiring ever increasing memory.

To avoid this, the applicant's invention uses the reset control 65 to change over between effective memory points in the signal modification circuit 50 so as to reuse the same effective memory repeated times.

This reset control circuit 65 operates when the two signals being compared are similar within prescribed parameters as previously set forth. It then changes over between similar signals. An example of the comparison can be seen in FIG. 17. This figure represents a circuit adding samples to a first analog signal 63 to produce a second, expanded analog signal 64. In this figure, after 38 cycles, the first analog signal 63 and the second analog signal 64 both have a positive going similar slope, same direction, zero crossings at the same location 70. If one immediately reset the signals, and began the cycle anew at this time, an individual to whom the signal 100 was addressed would not notice any significant artifacts. For this reason, the switchover could compensate for the increasing phase lag between the signals with memory having a finite length. The cost of this in FIG. 17 is the loss of one cycle of the first analog signal 63, which one cycle would never be produced to be perceived by the individual.

As previously set forth this resetting is most easily accomplished by changing over between two memory lines 56, 57 accompanied by a resetting of the second memory line (as was further described in respect to FIG. 16). While this compromises the input signal 10 information, this resetting significantly reduces the amount of memory necessary for the device to operate. More importantly, even if infinite memory were available, resetting must still be done. Otherwise, the desired effect of time compression or expansion would be completely cancelled. As an example of this, memory line 56 would be utilized for the time 67 with memory line 57 utilized for the time 68 to produce the output 64.

Figure 18:
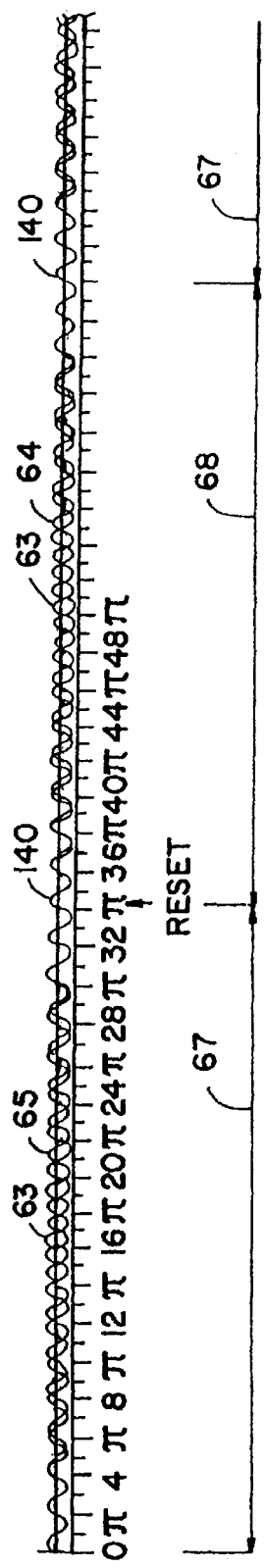
FIG. 18 is a figure like FIG. 17 illustrating a reset at the top of a signal waveform.

FIG. 18 represents a circuit deleting samples of a first analog signal 63 to produce a second compressed analog signal 65. This figure is a graph comparing the first analog signal 63 and the second analog signal 65 and illustrating the reset 140 of the signals at a common amplitude, similar frequency signal peak. At this time, again one would change over between the two memory lines 56, 57 and simultaneously reset the second memory line. This has the effect of adding to the output 100 by repeating one cycle of the input signal 10 information, again a resetting significantly reducing the amount of memory necessary to operate unnoticeably as well as maintaining through delay within acceptable limits. Again the two memory lines 56, 57 would preferably be utilized alternately to produce the output 64 without seams.

Figure 22:
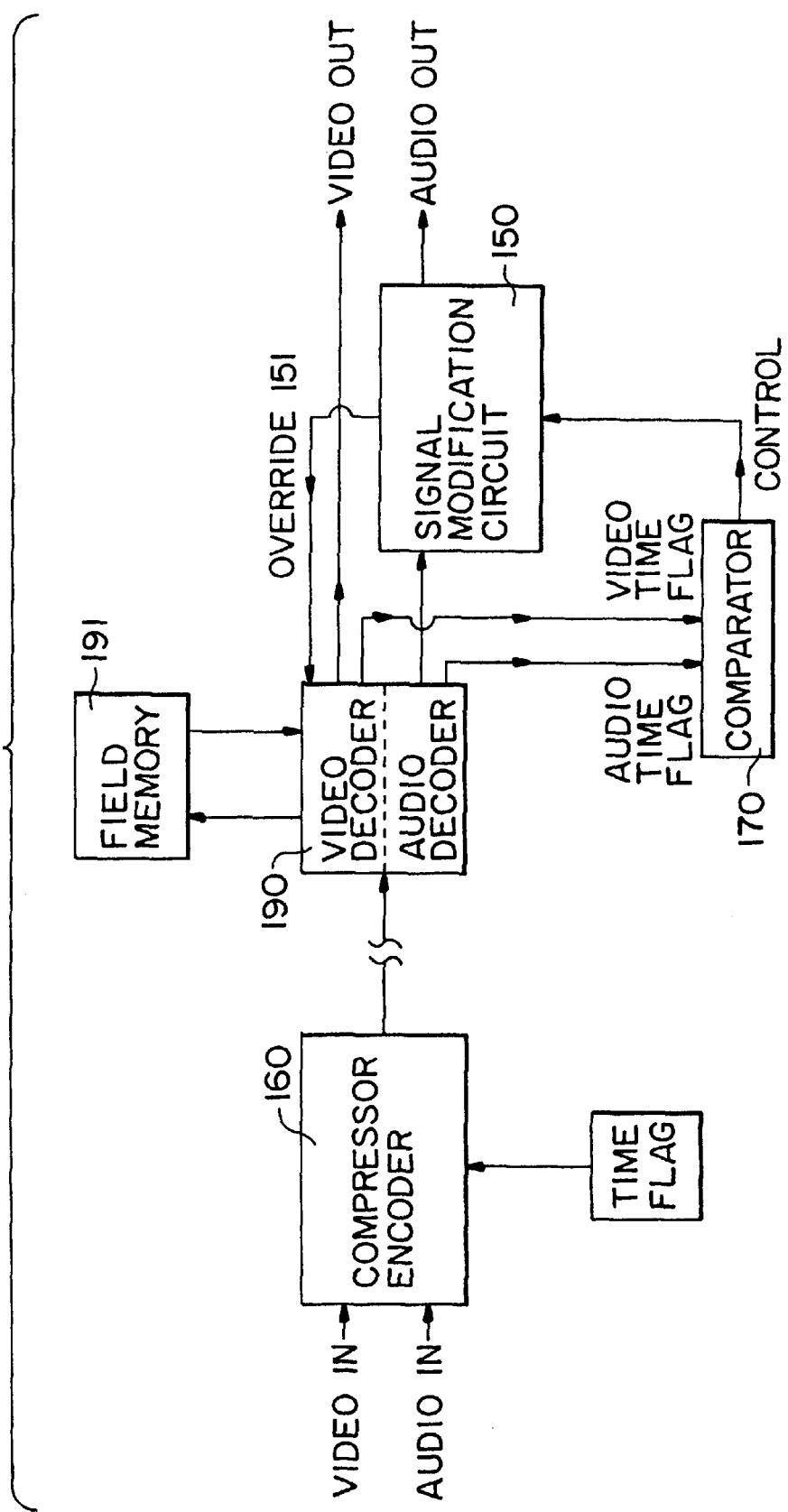
FIGS. 22–23 are block circuit diagrams of a MPEG implementation of the invention.
Figure 23:
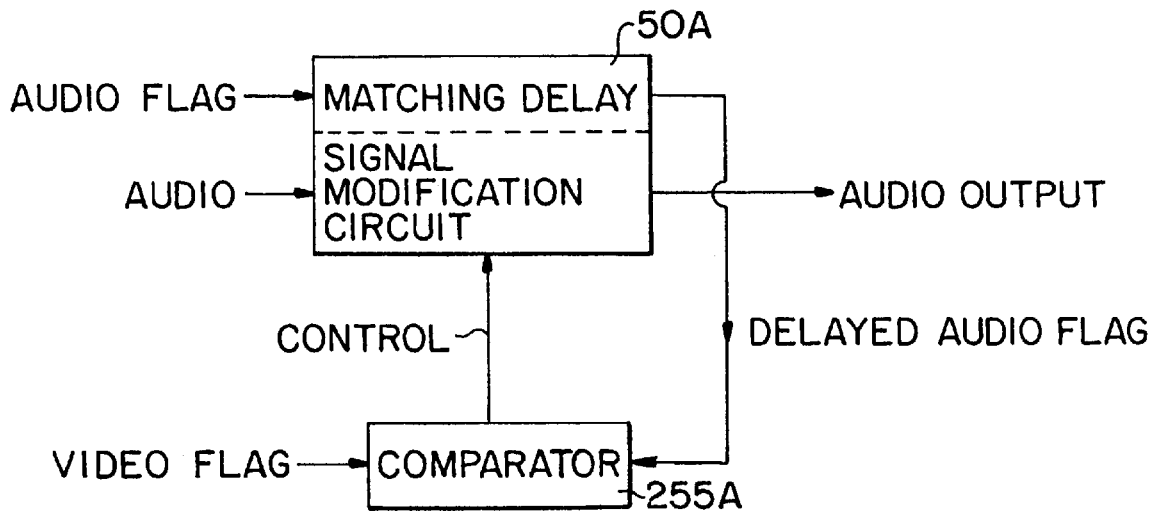

The invention finds particular application in MPEG audio and video compression (FIGS. 22–23). In the MPEG system, there is a considerable amount of video processing which goes on which is dependent upon the complexity of the video image which is compressed and/or decompressed. This is also true for the various audio signals which accompany the video. Due to the differences in compression complexity, there is frequently a corresponding variable delay interval in compression and/or decompression time which causes mis-synchronization of the audio and video signals when they are ultimately decompressed for use, as for example by receipt of an MPEG compressed HDTV television signal by a viewer.

In order to attempt to overcome the audio to video asynchrony problem, the MPEG compression standard provides for encoding a unique number in the compressed audio and video data stream every 0.7 seconds or so at the time of compression. Upon subsequent decompression, these numbers are presented to the audio and video system decoders in order to facilitate a comparison of the audio number to the video number in order to allow the two to be brought back into relative synchrony at these periodic times by manipulating the video via video frame memories. This still, however, can produce ascertainable artifacts tiring or objectionable to the observer. Further, multiple frame video memory buffers are necessary to allow the needed frame comparisons to repeat or drop identical frames.

This memory is expensive and the processing complex.

The above mis-synchronization of the audio and video signals of a particular entertainment program can be a serious problem, especially when the audio leads the video, as this is an unnatural condition and leads to conscious or unconscious stress in the viewer. This is an unfortunate by-product of the MPEG compression. The unnatural audio leading and/or trailing video condition is also known to diminish the viewer's perception of the quality, for example the entertainment value of the program being viewed.

The present invention can be utilized to re-synchronize the signals, thus eliminating the tiring and objectionable artifacts. Further, the multiple frame video delay and complex comparisons of the MPEG standards are not needed even though better synchronization is achieved. The invention accomplishes this by effectively speeding up or slowing down the audio signal(s) to synchronize it to the video, and does so without any pitch change.

The invention preferably utilizes the automatic reference signals to accomplish this synchronization. The two preferred reference signals which are encoded at the time of MPEG compression are SCR (System Clock Reference) and PTS (Presentation Time Stamps), the details of which may be found in the MPEG specification standards published by ISO/IEC. Other compression standards suffer from the same problems and may make use of these or similar SCR or PTS type schemes, which will be referred to collectively here as time flags.

The encoded time flags thus represent the starting time at which a particular video frame and its associated audio signal(s) arrive at the encoder, and/or are to be played back together from the decoder.

In this example MPEG system as it presently exists, if the video decoder sees that the video frame it is about to play back has a code which is later than that is, occurred after, the audio which is currently being played back, a frame of the video is repeated to bring the two close to synchrony. If the video frame is before the audio which is currently being played back, a frame is discarded. Such action, which is suggested by the MPEG standard, finds only limited capability in preventing audio to video asynchrony. Further, there are other problems with the frame drop/frame repeat method of achieving synchronization. First, adjustments may be made only in one frame increments, giving rise to potential residual errors. Also, the required video memory is costly compared to an equivalent amount of audio memory. Further, it may be that it is needed to discard a frame of video to synchronize signals, but the full frame might not yet have arrived due to complex decoding requirements. More than one frame of adjustment might also be needed, giving rise to the need for even more video memory with the associated cost problems. Since adjustment is made in frame jumps, this can also cause motion related artifacts, and, if the relative delay is constantly changing, the system can alternately repeat and delete frames of video causing an artifact known as motion judder (jitter+shudder). Further, the mis-synchronization that does exist could cause subconscious or even conscious ascertainable artifacts, reducing the viewer's enjoyment.

The invention of this application can be utilized in conjunction with a continuously variable audio delay to provide a better audio to video synchronization than in the present MPEG frame drop/frame repeat standard. Further, this is achieved at a lower cost. The invention preferably accomplishes this by adding samples to the audio to allow the audio to be slowed down to re-synchronize the signals (in the instance of advanced audio), or deleting samples to allow the audio to be sped up to re-synchronize the signals (in the instance of delayed audio). The signal modification circuit may be used by itself or in conjunction with a frame drop/frame repeat device.

The video signal to be output from the receiver's video decoder precedes the audio. This delay allows the processing of the video signal to synchronize the eventual audio signal output with the video signal. (The resulting correspondingly advanced audio is delayed in the receiver to allow synchronization to be achieved.) As previously discussed, this synchronization is accomplished in the MPEG standard by dropping or repeating video frames.

In the device of FIG. 22 incorporating the present invention, the MPEG input signals are fed from the normal compressor encoder circuits 160 in the customary mode of transmission (tape, transmitter, receiver, cable, etc.) to a modified adaptive decoder 190. The adaptive decoder 190 shown is modified from a customary MPEG adaptive decoder in that the adaptive decoder 190 has only slightly over a single field of video memory 191, and the use of this optional memory is to allow for an unusual override reset of the signal modification circuit 150 (as later described). (In contrast, the customary MPEG demodulator has at least two frames of memory, which memory is actively used for audio re-synchronization.)

The video signal in this modified device is directed through the adaptive decoder 190 to produce an output video signal in the customary manner according to with MPEG standards, except that it trails the audio signal by approximately two frames (this due to the deletion of the audio to video synchronization from the video signal path).

The audio input signals 10 are fed through the adaptive decoder 190 to convert such signals to customary form.

The audio input signals 10 are, however, then passed through a signal modification circuit 150 in order to add or subtract samples to synchronize the audio to the video signals. This synchronization is accomplished by adding or deleting samples in the audio input signal 10 according to the invention. Thus, as the relative delays of audio and video change, the audio delay time may be adjusted, without pitch changes, to enable proper synchronization with the video. This is preferred in that it occurs at a much lower hardware/software cost than a video memory or memory system would produce. This would normally be an intermittent procedure accomplished after relative synchronization was lost, typically during times of major video changes. The relative video delay allows re-synchronization without the introduction of objectionable artifacts. For example, the unique number transmitted every 0.7 seconds in the MPEG system could provide a reference for automatic synchronization by altering the signal modification circuit 150 to add or subtract samples as needed under the control of the interface comparing logic 170.

The control of the audio delay may be either a feed forward (FIG. 22) or a feed back arrangement (FIG. 23).

In the feed forward configuration, the time flags of the video and audio which are output from their respective decoders are compared to determine the amount of delay which the audio needs to achieve synchronization with the video. This delay is coupled to the audio delay control to cause it to change to the desired amount. In this application, the audio and video signals are fed through a compression encoder 250 subject to the time flag 251 in the customary manner. However, on decompression while the video signal 10 is fed through a customary rate convertor 253, the audio signal 10 is fed through the signal modification circuit 50 to re-synchronize the signals. A comparitor 255 analyzes the video flag and audio flag to automatically control the sample addition/deletion of the modification circuit 50.

In the feed back configuration, the time flags of the audio output from its decoder are delayed by the same amount as the audio is delayed in the variable memory. The audio time flag and audio may of course be delayed in the same, or separate matching memories. The video time flag corresponding to the output from the variable memory is compared to determine the amount of synchronization error of the audio relative to the video. This error is coupled to the audio delay control to cause it to change to correct the error. In this application, the audio signal 10 is fed to a modified signal modification circuit 50A, a circuit that actively acts on the audio flag in addition to the audio signal 10. The comparitor 255A then compares this delayed audio flag to the video flag in order to control the signal modification circuit 50A to re-synchronize the audio output to the video.

In this re-synchronization, however, as previously described in respect to FIGS. 16–18, there is a possibility that very occasionally the reset control 65 in the signal modification circuit 50 might not have operated near to the end of an operative total delay length. In FIG. 22, when this would occur, the field memory would preferably be operated in order to repeat a field, and thus allow for the forced resetting of the signal modification circuit 50. In the embodiment shown, this is provided by an override signal 151 from the signal modification circuit 150 to the video decoder.

Figure 24:
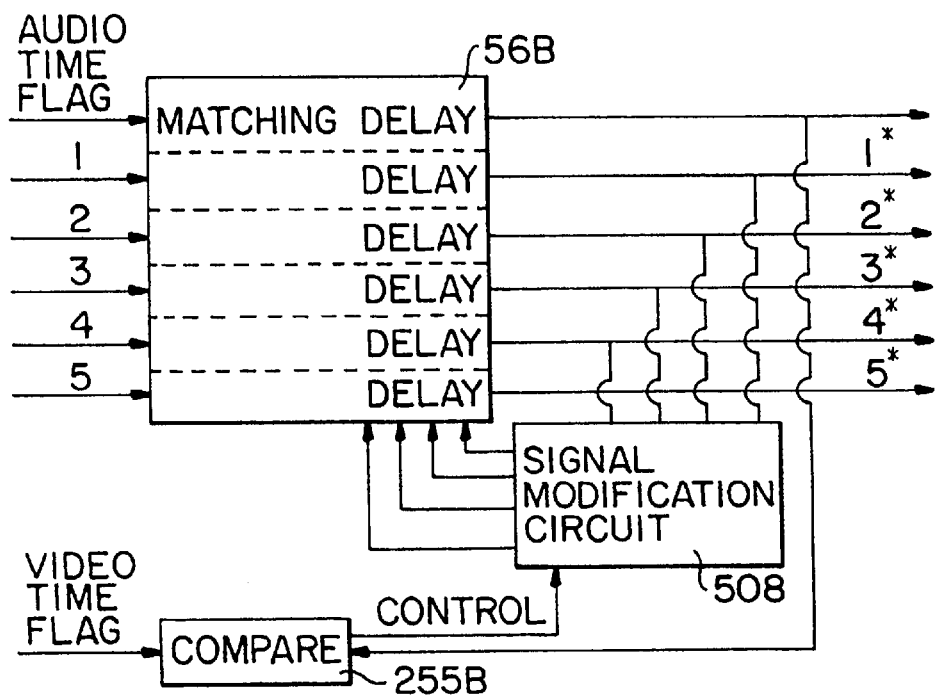
FIG. 24 is a block circuit diagram of a multiple channel device.

As a further improvement, it will be advantageous to either compare time flags of multiple sound channels of a given audio signal in order to correct any channel to channel phasing and polarity errors which may exist (FIG. 24). One example of such a system would be video surround sound audio having 5 channels corresponding to left front, right front, left rear, right rear, and subwoofer. The channels would be compared to each other to ensure that their relative phasing or timing are kept correct, with any timing errors being used to control fine phase adjustment of each controlled audio channel. In this application, the various channels 1–5 would each be subject to its own individual delay in the delay circuit 56B, with samples added or subtracted therefrom based on a signal modification circuit 50B. This circuit 50B and the delays are automatically adjusted by the flag comparison circuit 255B. Feed forward could also be utilized.

The control of multiple sound channel timing for any multiple sound channel application may be implemented by itself with the variable delay capability of the present invention. This is especially true because of the precise delay control which may be achieved in the present invention. Multiple sound channel timing control is, however, quite cost effective. Further, it is very useful to include such correction as an additional capability of audio to video synchronization circuitry. Another invention showing correlation of multiple audio channels for applications where audio and video are transmitted over different paths is shown in Cooper U.S. Pat. No. 4,703,355 which is incorporated herein by reference with respect to its prior art teachings and in particular, signal correlation and generation of control signals responsive thereto.

The invention may be utilized in an entertainment or other system to provide faster or slower than normal recording or replay of audio, and if desired associated video. Other information may be utilized as well, with the teachings herein being just as applicable to storage or replay of any information having a frequency parameter where it is desired to alter the time duration without altering the frequency.

Figure 25:
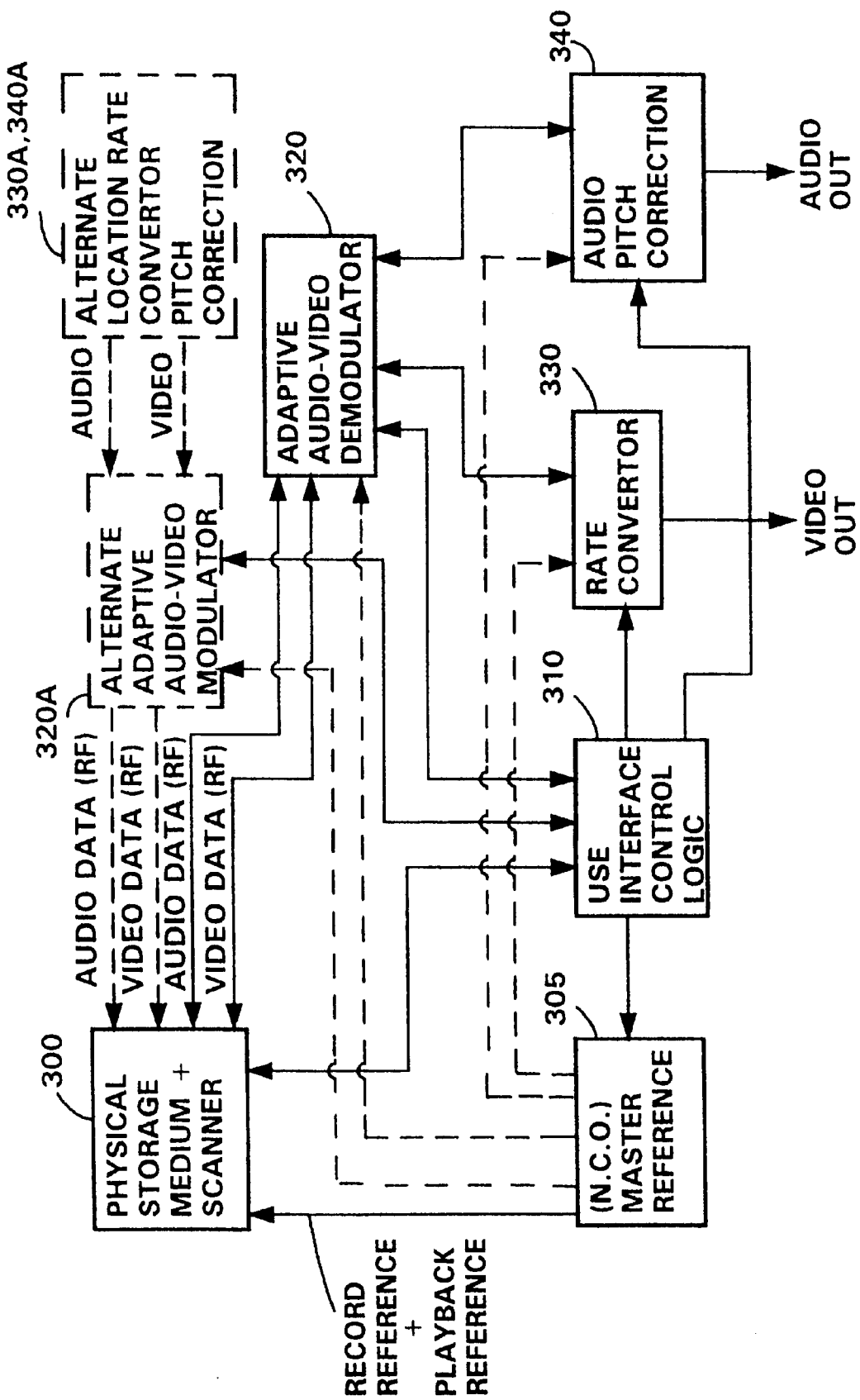
FIG. 25 is a block diagram of a circuit for signal playback.

FIG. 25 shows a system in which a physical storage medium 300 along with its associated scanning mechanism is controlled by the user by providing a varying reference to the scanning mechanism. It is preferred that the physical storage medium be a digital video disk such as a common optical CD device which utilizes a spindle motor to rotate the storage medium, which is the disk, and a laser and optical scanning head which make up the scanning mechanism. It is preferred to provide the servo mechanism for the spindle motor with a variable frequency reference signal which is provided by a Numerically Controlled Oscillator (N.C.O.) 305 which frequency is controlled by the user interface and control logic 310.

The user interface and control logic 310 also interactively controls the optical scanning head position, receiving positional data from the scanning mechanism (which alternatively may be provided via the recorded data) to perform start, stop, record, play, search and other functions normally provided. In this manner the recording or playback of the audio and/or video data may be controlled to take place at different and variable rates. It should be noted that while the term data is used to denote what is stored in the storage medium, that it is not to be construed that this data is to be limited to digital data. Data as used herein is simply meant to mean the information which is stored in whatever form it may exist.

While this embodiment of the invention is preferred to be a CD device, one skilled in the art will recognize from the teachings herein that any storage device may be adapted to implement the invention, including analog video disk recorders, analog audio tape recorders, DAT recorders, video optical disc recorders, video tape recorders, rotating magnetic disk recorders (such as computer disk drives), film based recorders and projectors, solid state memory including semiconductor memories, charged coupled device memories, switched capacitor recorders, and three dimensional solid memories such as laser addressed crystal lattices. All of these storage device types have in common a mechanical, electronic, optical or combination scanning mechanism which selects where within the physical storage medium the data is stored or read. It is by controlling the rate at which this scanning mechanism operates that the rate of storage or reading is made variable. The invention may be utilized with record only, playback only or record and playback versions.

As one skilled in the art will understand from these teachings, varying the rate of reading or writing may not be successful over a very large range by simply causing the scanning mechanism to operate at different rates. In virtually all storage devices, the data is stored in a form which takes on many analog characteristics. With the preferred optical disk medium, the data is stored as alternating light polarization of a layer of material. The data is read back by the laser beam which beam is directed to an electro-optical sensor or converter thus providing an electrical signal which varies in response to the laser light. By changing the speed of the disk and scanning, the frequency and intensity characteristics of the laser light are altered, thereby altering the frequency and intensity characteristics of the corresponding electronic signal.

In virtually all recording and playback systems, there is required compensation circuitry to make up for nonlinear characteristics of the system. These compensation systems are critical to the proper recovery of the audio and video and are included in the modulator 320A and demodulator 320 circuitry. Unfortunately, the nature of these nonlinear characteristics is dependent on the scanning speed, thus causing a serious compensation problem which is overcome in the above system. Most commonly, frequency response of the system changes in fashion which is dependent upon the frequency of the data. Many systems operate to detect the changes in the data rather than the data itself. The sensors which are thus used most commonly respond to the electrical, magnetic, electromagnetic, or optical flux from the storage and scanning mechanism combination and have an output which is proportional both to the magnitude and rate of change of the flux. The demodulator 320 thus must compensate for the change which compensation in turn must be altered as the rate of change of flux is altered by the changing of the scanning speed.

Figure 27:
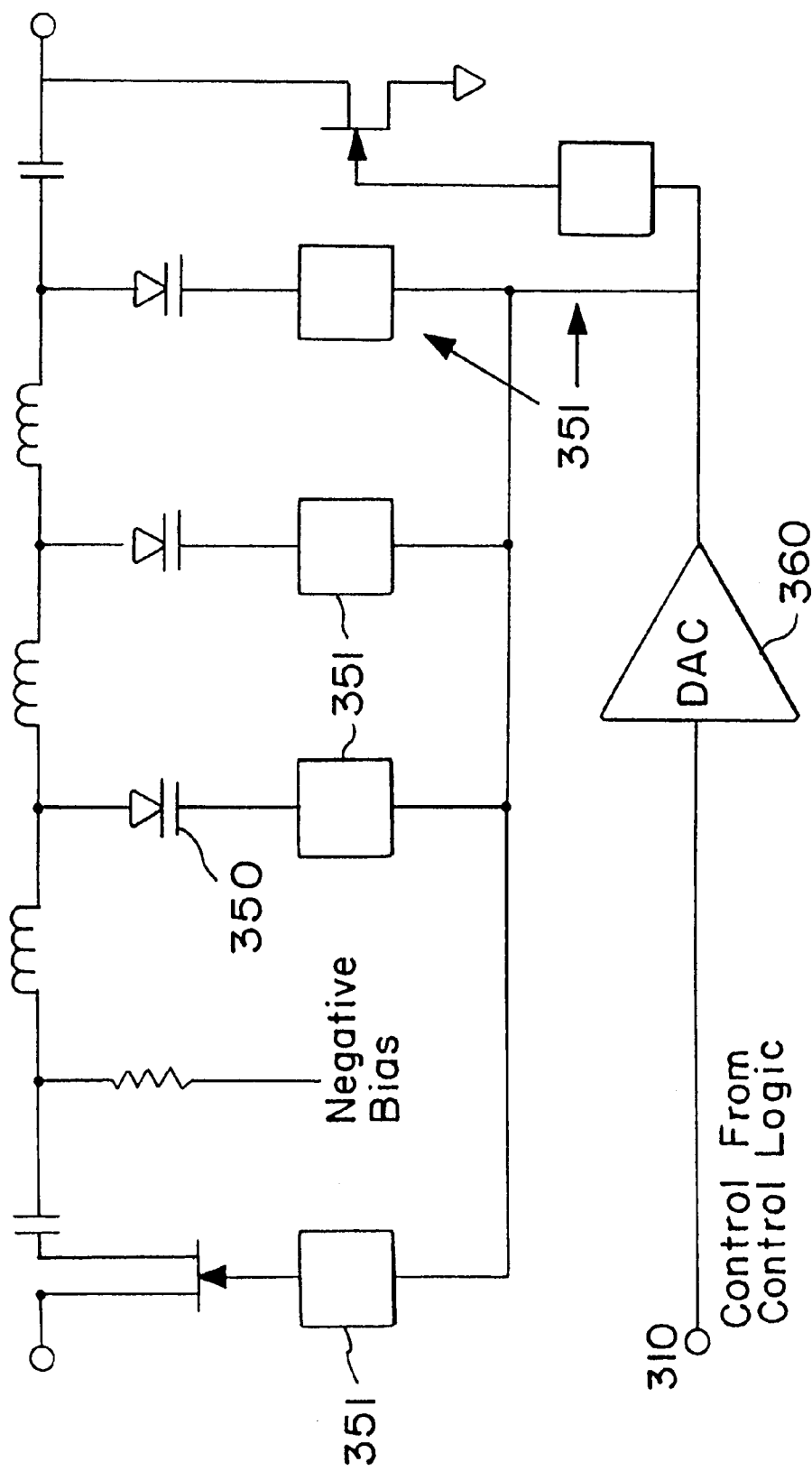

The requirement to change the compensation caused the demodulator 320 to be adaptive, and controlled by the user interface and control logic 310 in order to properly demodulate the audio and video at any of the continuously selectable playback speeds. FIG. 27 shows an adaptive filter network which is operable to change the filter compensation to fit the playback or record speed. The filter utilizes varactor diodes 350 to provide a voltage variable capacitance, thus changing the filter frequency characteristics. The voltage which is applied to the varactors is provided by a digital analog converter 360, which in turn is loaded with the appropriate digital number for the particular speed being used, which loading is accomplished by the user interface and control logic 310. Linearization or voltage mapping circuits 351 are provided at the input and output of the filter and at the varactors 350 to compensate for any non-linearities therein. In operation the filter operates to reduce the high frequency content of the data signal to a proper level, the amount of reduction depending on the speed of the data.

Returning to FIG. 25, as for any particular physical storage medium which would be preferred, the proper design of compensation at given fixed speeds is well known to those skilled in the art. It is believed that from the teachings given herein, those skilled in the art will also be capable of designing compensation which is variable over a suitable range of operation. In this manner the invention of the figure may be practiced such that the operator may select any speed within a range of speeds with the recording and playback of data of the storage medium operating properly.

It should be noted that some existing audio tape recording systems have the capability to change frequency equalization of the audio signal as the tape speed is changed from one discrete speed to another, for example from 7.5 IPS to 15 IPS. In addition, many of these tape recorders may playback at continuously variable speeds to facilitate searching. Applicant is unaware of any of these systems having continuously variable equalizers to insure properly equalized audio at all of the continuously selected speeds which the operator is capable of selecting.

After the audio and video is demodulated by the adaptive demodulator 320, it is required to pitch correct the audio under control of the user interface and control logic 310 as by the circuitry described in the preceding figures, and to convert the rate of the video to standard rates in order that it may be viewed on standard viewing devices. The video rate converters 330 are known in the art as frame synchronizers. While it is possible for frame synchronizers to operate self contained, improved operation and lower cost may be obtained by providing the rate converter with information and control from the user interface and control logic, and additional features such as video special effects may be provided as well. The pitch converter 340 is as set forth in this present application.

If it is desired to record at variable rates, the same problems as described above for playback enter into the proper modulation of audio and video before recording. Consequently it is needed to provide an adaptive modulator 320A. In addition, it may be desirable to provide a pitch corrector 340A and video rate converter 330A on the record side of the device in order that the recorded data appears as if it had been recorded at a particular rate. One skilled in the art will recognize that a desired end result of expanding or compressing a time segment may be achieved by operating on the video and/or audio either when recording or upon playback or both. In addition, there is no requirement that both audio and video be operated on at the same time, as one may be corrected on recording and the other upon playback.

A two-way pitch shifter has been implemented with a Star Semiconductor SPROC IC and is shown in FIG. 20. The SPROC IC is available from Star Semiconductor of San Jose, Calif. and is of type SPROC-1400-50PG132C. Information on the use of this and similar ICS is available from Star.

The preferred embodiment would use type SPROC-1400-50MQ144C, which functions similarly, but at a lower cost.

The block diagram FIG. 20 is directly compatible with the SPROC Development System Part Number SPPROClab™ version 1.25, P/N SDS-1001-03 with SPROClab version 1.25 patch B, P/N SDS-1002-01B. FIG. 20 is a schematic representation of digital signal processing.

In this embodiment of the invention, the frequency converter system is specifically designed for a stereo audio source having a 20 kHz input bandwidth. However, it should be understood that the frequency converter system is equally adaptable to systems of various input frequencies and bandwidths. The audio input signals 10 are sampled at 48 kHz sample rate. The 50 Mhz P/N SPROC-1400-50PG132C SPROC chip is used for processing. Left and right channels are processed identically, and in parallel. Some control blocks (or "cells" in the Star Semiconductor nomenclature) are common to both left and right.

Three basic operations are performed: stretch (or expand)/interpolate or compress/interpolate, reset, and reset timing control.

ST_INO 202 accepts Format 2 stereo input samples which are provided by a Crystal Semiconductor CS5326 A-D Convertor. Output 1 is the right channel, and output 2 is the left. This discussion will concentrate on the left channel and common processing.

Stretch cells ST1 200 and ST2 201 each perform the stretch/interpolate or compress/interpolate functions in stereo. Most of the time, only one is actually connected to the output. Two are required during a reset operation, as will be described below. ST1 200 and ST2 201 perform reads and writes to RAM circular buffers 56, 57 in order to accomplish the stretch or compress function.

Two-way stretch cells are used at ST1 200 and ST2 201. In the pitch increase mode, delay might start at 35 mS and decrease until a cross-fade reset event occurs. At reset, delay is returned to or near 35 mS, and the process repeats. In the pitch decrease mode, delay starts at or near zero, and increases until a cross fade reset event occurs. At reset, delay returns to near zero, and the process repeats. Thus, while in the pitch decreasing mode some program material is discarded at a reset, in the pitch increasing mode some program material is repeated. In the pitch increase mode, ST1 200 and ST2 201 output stereo samples at the 35 mS memory candidate reset point for splice match testing. These samples, "OUTC" 203 and "OUTD" 204 of ST1 200 (203A, 204A) and ST2 201 (203B, 204B) cells, pass through switches SW3 205 and SW4 206 so that those of the correct stretch cell may be selected. If the pitch decrease mode is selected, "OUTC" and "OUTD" produce samples of near zero delay.

An abrupt reset of a single stretch cell often results in an audible click. In this design, a more gradual reset occurs as follows. Suppose only ST1 200 is connected to the output. Further suppose the pitch decrease mode is operative. At the start of a reset, ST2's 201 delay is set to or near zero. At the same time, a gradual fade from ST1 200 to ST2 201 is initiated and performed by 207. At the completion of the fade, only ST2 201 is connected to the output. The delay through each stretch cell continues to change during the fade operation. At the next reset, the operation is reversed, and so on. This technique is effective at suppressing reset clicks.

The left channel outputs of ST1 200 and ST2 201 connect to the output via MFADE0 207. A ramp signal is applied to MFADE 207 to accomplish the fade. This ramp is formed by MMV1 211, MMV2 212, MINUS3 217, and INT2 214. Depending on direction, either one-shot MMV1 211 or MMV2 212 produces a pulse 3072 samples (64 mS) long. Integrator INT2 214 forms the ramp. Subtraction cell 217 causes alternate ramps to be in different directions. INT2 214 output takes values between 0 and 1.0. Ramp length of 64 mS was determined empirically. Too short a ramp produces an abrupt transition; too long produces an echo effect.

A reset is initiated only when the differences between input and output slope and instantaneous amplitude are within certain limits, in order to make the cleanest splice practicable. Amplitude and slope match for the left channel are measured by MINUS2 221; first-difference cell DIFF2 222; and cells p1 223 and p3 224. SW1 225 selects the appropriate stretch cell output. p1 223 or p3 224 produces an active low reset signal whenever the magnitude at the cell input is below a certain threshold. These thresholds are continuously scaled according to signal level and slope. The intent is to require the same relative match, independent of amplitude or instantaneous frequency. This scaling is performed by SUM1 213; DIFF3 230; and, peak detectors PD0 231 and PD1 232. SUM1 213 performs full wave rectification, of each input, and sums the results to produce its output. PD0 231 and PD1 232 gains set the degree of match required.

Outputs from p1 223 and p3 224, as well as outputs from the corresponding right channel cells p9 235 and p10 236, must all be simultaneously low to enable a reset. Or gate OR1 229 performs this function. Additionally, cell p7 237 sets the minimum time between reset events at 9600 sample periods (200 mS). Any reset inputs to p7 within the last 200 mS from a reset output from p7 are ignored. The 200 mS value was empirically optimized as a compromise between rapid warble-like artifacts and loss or repetition of program material. Minimum time between resets could be caused to vary randomly about the 200 mS value, to reduce the periodicity of resets. Some artifacts are still detectable. Cells p8 247 and OR4 248 have been carried over from previous design iterations, but are not functional in this design.

p7 237 emits a one sample width active low reset pulse. This is steered to the appropriate one-shot and stretch cells by logic formed by threshold detector GT1 238; INV1 240; Or2 241; and, OR3 242. Delay cells DELAY2 245 and DELAY4 246 are intended to correct timing misalignments.

Cells that are specific to right channel operation are DELAY3 249, SW2 250, MINUS4 251, SUM4 252, p9 235, p10 236, DIFF4 252, DIFF5 253, PD2 254, PD3 255, RECT5, and p11 256. p11 is not functional in this design. Stereo output is accomplished by parallel port output cells OUT0 257 and OUT1 258. Output parallel data is subsequently converted to serial format by hardware interfaced to the SPROCtm parallel port. This serial data is then converted to 8× oversampling format by a Nippon Precision Circuits Ltd. SM5813APT IC. The oversampled data is passed to two Analog Devices, Inc. AD1862N digital-to-analog converter ICS, to produce analog stereo audio output. Control of pitch correction factor and reset point is accomplished by changing the output levels of VR98 259 and VR99 260. To decrease pitch by 9.09 percent, VR98 level should be 2 (reset point of 2 samples delay), and VR99 level should be 1.0. For no pitch change, VR98 level should be 2, and VR99 level should be 0.0. To increase pitch 10 percent, VR98 level typically would be 1680 (reset point of 1680 samples, or 35 mS, delay), and VR99 level should be −1.1. AMP3 261 scales the pitch correction factor output from VR99 260 and passes it to stretch cells ST1 200 and ST2 201. The output levels of VR98 259 and VR99 260 may be modified by the SPROC development system, both during the initial building of the design, and during operation. Ideally, pitch correction factor and reset point may be controlled by an embedded microprocessor communicating with one of the SPROC ports. Serial output cell OUT3 262 sends the fade ramp signal to a PCM56 DAC on the development board. This signal is a useful telltale of system performance. This port is not supported in the production board hardware, but this signal could be sent to the probe port (which will be supported) by modifying the SPROC™ initialization code.

Left and right channels are reset simultaneously, and must meet the reset criteria simultaneously. The lowest gain possible for PD0 231, PD1 232, PD2 254, and PD3 255 should be used. Experiments with program material showed that gains of less than 0.1 (for example, 0.08) were too low. With gains of 0.08, excessive time between resets were regularly observed. Program material tests at 9.09 percent pitch decrease mode, with gains of 0.1, indicate that most resets occur within 250 mS, and that intervals beyond 300 mS are rare (the corresponding memory in the stretch cell would be one tenth these numbers; at 9.09 percent pitch decrease). These gains, as well as the other parameters such as minimum reset interval and ramp slope are easily changed in software.

The memories of ST1 200 and ST2 201 in FIG. 20 are arranged as circular buffers. Data is continuously written to the inputs such that each buffer contains the most recent samples for a period equal to the memory length. In fact, the contents of each memory are the same, since each has the same input. In addition, OUTC 203A and OUTC 203B output the same data. The same is true for OUTD 204A and OUTD 204B. Therefore, an improved embodiment would be obtained by combining ST1 200 and ST2 201, and using a single memory. SW3 205 and SW4 206 would no longer be required. It may also be possible to combine the functions of OUTA with OUTC and OUTB with OUTD, respectively. A minimum of two separate memory outputs would still be needed, of course, to support the signal comparison and reset operations. Further code savings could be obtained by eliminating the NDXIN and NDXOUT outputs from ST1 200 and ST2 201, or a combined cell, since these outputs are not used in this embodiment.

FIG. 21 shows pitch correction integrated with the delay function. The pitch corrector functions of FIG. 20 are essentially cascaded intact with the delay function, except with the added ability to force or inhibit stretch cell 200 and 201 reset. Cell TAU0 263 operates directly on the input samples, and produces delay. TAU0 263 changes delay in a manner identical to stretch cell operation, but without resetting. TAU0 263 utilizes external memory. Since pitch shift occurs during delay change, TAU0 263 output is passed to ST1 200 and ST2 201 for pitch correction. TAU0 263 also performs parallel port access for stereo sample output and micro-controller interface. Stereo output samples from MFADE0 207 are passed to TAU0 263 for output via the SPROC™ parallel port.

Cell CN0 264 coordinates operation of the delay and pitch correction cells. TAU0 263 reports its current delay to CN0 264. CN0 264 reads stretch cell index values. The indices from the active stretch cell are selected by SW5 265 and SW6 266. CN0 264 computes the current stretch cell delay, and add; the TAU0 263 delay to determine total delay. This total delay is passed to TAU0 263 for parallel port output to the micro-controller.

Target delay is read from the micro-controller via TAU0 263. If total delay equals target delay, CN0 264 holds TAU0 263, ST1 200, and ST2 201, by writing zero to the slew factor inputs of those three cells, and inhibiting stretch cell reset.

If total delay differs from target delay by more than 20 mS, the following sequence of events occurs. First, the stretch cells are initialized. If the delay change direction should be opposite of the previous change, it is likely that the initial stretch cell delay is too far removed from the appropriate reset point. CN0 264 sweeps the reset point values in the vicinity of the nominal for a period of 0.5 Sec, enabling a high probability of a splice. When this splice occurs, the stretch cell becomes initialized without an abrupt transition. Then, CN0 264 outputs complementary slew values to TAU0 263, ST1 200, and ST2 201. This produces delay change and pitch correction at a ten percent rate. ST1 200 and ST2 201 delay the slew factor by the same amount as the audio, to maintain temporal registration between the two. The total delay change occurs primarily during fades, because of the pitch corrector reset action. Delay change during each fade is generally of slightly more than 20 mS in size. When the total delay becomes within +/−20 mS of the target, the stretch cells are held, and TAU0 263 slews at a 0.2 percent rate, without pitch correction, until the target is reached. If TAU0's 263 delay reaches zero before the target is reached, TAU0 263 is held, and the stretch cell delay is decreased at a 0.2 percent rate, without pitch correction, until the total delay is correct.

For delay changes of 20 mS or less, the delay slews at a 0.2 percent rate, without stretch cell initialization or pitch correction.

The minimum delay target is one sample (1/48000 Sec.), not counting data converter decimation or interpolation filter delay. Dump mode is enabled by requesting zero delay. In dump mode, TAU0 263, ST1 200, and ST2 201 are reset to minimum delay and held. Requesting a non-zero delay target causes normal operation to resume. In the present embodiment, control via the SPROC™ development system is substituted for microprocessor control.

In FIG. 21 ST1 200 and ST2 201 could also be combined in a manner similar to that described for ST1 200 and ST2 201 of FIG. 20. As before, SW3 205 and SW4 206 would not be needed. In a combined stretch cell, only a single output NDXIN would be required, which would also eliminate SW5 265.

Further reduction in code would be obtained by combining ST1 200 and ST2 201 not only with each other but also with memory cell TAU0 263. A single memory would then be used.

In both FIG. 20 and FIG. 21, a smoother fade ramp could be obtained by using a raised-cosine function, instead of a linear ramp. In an improved embodiment, a watchdog timer function would be incorporated into the hardware and code.

The preferred embodiment of the present invention may be modified without deviating from the invention as claimed.

For example, the preferred embodiment is described as operating on the input signal, a signal which is being produced at a first speed, to produce the output signal, which output is subsequently clocked at the second speed to provide the same frequency based information. It would be possible to modify the order of conversion without deviating from the invention as claimed. For example, one could modify the frequency conversion system of the present invention to create a second plurality of signals clocked at different speed prior to frequency conversion. This could occur, for example, on a taped system operated at a higher or lower speed than normal to produce a signal in need of frequency conversion. It could also occur on any type of signal wherein the signal is stored on a disk, record, tape, computer RAM memory, or otherwise in either a digital or analog form, which signal is capable of being operated at something other than real time speeds (both faster or slower). In this modified device, the input signal would be reproduced at the output signals' speed in order to create a version of the second plurality of signals. An example of this would be to speed up an audio tape recorder to produce a pitch changed version of the audio stored thereon. At this time, the frequency converter system of the present application would act upon this sped up version of the second plurality of signals in order to modify the number of samples therein to meet the requirements of the new clock speed and thus produce the pitch shifted output signal. No further memory would be needed if the sampling rate was high enough. In the example audio tape recorder, samples would be added in order to lower the pitch of the output signal to match the pitch of the input signal originally recorded on the tape recording, and thus produce a output signal having a frequency substantially the same frequency as the input signal. The frequency converter of this invention can therefore operate before, during or after the clock shift of the input signal. Similarly, the clock shift can be upwards (compression), downward (expansion), or the same as (dropout compensation, profanity dump) at any time during recording, storage, and/or replication of the input signal.

It is envisioned that other known techniques, such as homomorphic signal processing, sub-band coding, Fourier transformation[5], power spectrum estimation[1], correlation, or measurement of relative second or higher order differences, could be used or adapted to improve the signal comparison. For example, homomorphic deconvolution, followed by linear filtering, may be applied to speech signals to separate pitch and other components[1,2]. Separated parameters could be respectively compared. As another example, in sub-band coding a speech, image, or other waveform is divided into several frequency bands, where each band is coded separately[3]. Individual sub-band components could be respectively compared. As a further example, spectrum amplitude and/or phase components as resolved by Fourier transformation could be compared. In the case of correlation, signals could be compared over some length considerably larger than that of the comparison used in the present embodiment.

It is envisioned that in an improved embodiment techniques such as homomorphic deconvolution, sub-band encoding, or Fourier transformation[5] could be used, with suitable modification, prior to the pitch shifting operation, to provide signal component separation. The pitch conversion would then be applied to one or more of the separated signal components. As a particular example, homomorphic deconvolution, followed by linear filtering, followed by the inverse to the homomorphic deconvolution, may be applied to a speech signal to separate pitch from other components. The described invention could be applied to the so obtained pitch signal. Next, the frequency converted pitch signal would be suitably recombined with the other components. It is known that the representation of speech in parametric form allows a modified pitch contour to be applied to the data[2].

It is also envisioned that data compression techniques would be advantageous. For example, linear predictive coding applied to a speech or other signals reduces the data rate required to represent the waveform[3]. Likewise, sub-band coding applied to speech, video, or other signals reduces the data rate required to represent the waveform[3]. Narrow band voice modulation (NBVM)[4] techniques reduce the occupied bandwidth of a speech signal, allowing a lower sample rate to be used. Operating on compressed data would reduce the described invention's memory and signal processing hardware requirements.

1. Oppenheim, Alan V., and Shafer, Ronald W., Digital Signal Processing, Prentice-Hall, 1975.
2. Rabiner, Lawrence R., and Gold, Bernard, Theory and Application of Digital Signal Processing, Prentice-Hall, 1975.
3. Proakis, John G., Rader, Charles M., Ling, Fuyun, and Nikias, Chrysostomos L., Advanced Digital Signal Processing, Macmillen, 1992.
4. Ash, Christensen, and Frohne, "DSP Voice Frequency Compander for use in RF Communications," QEX, July 1994.
5. Benson, K. Blair, Audio Engineering Handbook, McGraw-Hill, Inc., 1988.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed:

1. A method of synchronizing a signal having frequency related information timed relative to a first time reference to a second signal on an associated channel timed relative to the same time reference which first signal may or may not be synchronized to the second signal at any point in actual time, the second signal being subject to a delay which may vary in respect to the first signal, the first signal having an alpha length;

said method comprising determining the time differential between the first signal and the second signal on the associated channel and then altering the alpha length of the first signal in response to time differential to compensate for the delay which may vary of the second signal.

2. The method of claim 1 wherein the associated channel includes a synchronization pulse and characterized by the determination of the time differential includes the synchronization pulse.

3. The method of claim 1 characterized in that altering the alpha length of the first signal includes digitally sampling one of the input or output signal and then modifying the number of samples of the digitally sampled signal.

4. The method of claim 3 characterized in that at least said number of samples is stored in a memory.

5. The method of claim 3 wherein at least said number of samples are stored in a memory having a limited value and there are two signals displaced from each other in respect to the memory, and characterized by the addition of a resetting of the memory upon the comparison of the two displaced signals.

6. The method of claim 3 wherein the second signal is a stored signal normally reproduced over a time period differing from real time and the altering the alpha length of the signal includes compensating for the difference between the time period and real time.

7. The apparatus of claim 1 wherein the second signal is a stored signal normally reproduced over a time period differing from real time and said means for altering the alpha length of the first signal including means for compensating for the difference between the time period and real time.

8. The method of claim 1 characterized in that there are multiple signals timed relative to the same time reference, which multiple signals may or may not be synchronized at any point in actual time, and said method further including determining the time differential between said multiple signals and altering the alpha length of at least one of the multiple signals to resynchronize said multiple signals.

9. The apparatus of claim 1 wherein the first signal is an audio signal which is associated with a time varying image and characterized in that said means for altering the alpha length of the first signal includes means for imparting a changing delay.

10. The apparatus of claim 9 characterized in that the audio signal is digitally sampled and said means for imparting a changing delay includes delaying the digital samples of the audio signal for a time period which may vary.

11. The apparatus of claim 10 characterized in that said means for altering the alpha length of the first signal includes a pitch correction means responsive to the digital samples in delayed or undelayed form for correcting pitch artifacts during the varying of said time period.

12. The apparatus of claim 9 characterized in that there are a multiplicity of audio signals and a multiplicity of means for altering the alpha length of such signals.

13. The apparatus of claim 12 characterized by the addition of a timing control circuit means, and said timing control circuit means maintaining the relative timing of said multiplicity of audio signals.

14. An apparatus for synchronizing a signal having frequency related information timed relative to a first time reference to a second signal on an associated channel timed relative to the same time reference which first signal may or may not be synchronized to the second signal at any point in actual time, the second signal being subject to a delay which may vary in respect to the first signal, the first signal having an alpha length, said apparatus comprising means for determining the time differential between the first signal and the second signal on the associated channel and means for altering the alpha length of the first signal in response to time differential to compensate for the delay which may vary of the second signal.

15. The apparatus of claim 14 wherein the associated channel includes a synchronization pulse and characterized by the means for determining the time differential includes means to recognize the synchronization pulse.

16. The apparatus of claim 14 characterized in that means for altering the alpha length of the first signal includes means for digitally sampling one of the input or output signal and means for modifying the number of samples of the digitally sampled signal.

17. The apparatus of claim 16 characterized in that at least said number of samples is stored in a memory.

18. The apparatus of claim 16 wherein at least said number of samples are stored in a memory having a limited value and there are two signals displaced from each other in respect to the memory, and characterized by the addition of means for resetting of the memory upon the comparison of the two displaced signals.

19. The apparatus of claim 14 characterized in that there are multiple signals timed relative to the same time reference, which multiple signals may or may not be synchronized at any point in actual time, and said apparatus further including means for determining the time differential between said multiple signals and means for altering the alpha length of at least one of the multiple signals to resynchronize said multiple signals.

20. The apparatus of claim 14 wherein the first signal is an audio signal which is associated with a time varying image and characterized in that said means for altering the alpha length of the first signal includes means for imparting a changing delay.

21. The apparatus of claim 20 characterized in that the audio signal is digitally sampled and said means for imparting a changing delay includes delaying the digital samples of the audio signal for a time period which may vary.

22. The apparatus of claim 21 characterized in that said means for altering the alpha length of the first signal includes a pitch correction means responsive to the digital samples in delayed or undelayed form for correcting pitch artifacts during the varying of said time period.

23. The apparatus of claim 20 characterized, in that there are a multiplicity of audio signals and a multiplicity of means for altering the alpha length of such signals.

24. The apparatus of claim 23 characterized by the addition of a timing control circuit means, and said timing control circuit means maintaining the relative timing of said multiplicity of audio signals.

25. An apparatus for imparting a changing delay to an audio signal which is associated with an image which is subject to differing processing time periods including in combination:
a) a delay for delaying digital samples of said audio signal for a time period which may vary;
b) a control circuit coupled to said delay for varying said time period;
c) a pitch correction circuit responsive to said digital samples in delayed or undelayed form for correcting pitch artifacts which may occur during said varying of said time period.

26. Apparatus as in claim 25 wherein a plurality of associated audio signals are delayed and further including a timing control circuit for maintaining the relative timing of said plurality of associated audio signals during said varying of said time period.

27. A method as in claim 25 wherein a plurality of associated audio signals are delayed and further including maintaining the relative timing of said plurality of associated audio signals during said varying of said time period by a timing control circuit.

28. A method for imparting a changing delay to an audio signal which is associated with an image which is subject to differing processing time periods including in combination:
a) delaying digital samples of said audio signal for a time period which may vary;
b) varying said time period by a control circuit coupled to said delay;
c) correcting pitch artifacts which may occur during said varying of said time period by a pitch correction circuit responsive to said digital samples in delayed or undelayed form.

29. An apparatus for synchronizing an audio signal having frequency related information timed relative to a first time reference to a video signal on an associated channel timed relative to the same time reference which audio signal may or may not be synchronized to the video signal at any point in actual time, the video signal being subject to a delay which may vary in respect to the audio signal due to the processing of the video signal, the audio signal having an alpha length, said apparatus comprising means for determining the time differential between the audio signal and the video signal on the associated channel, means for altering the alpha length of the audio signal in response to time differential to compensate for the delay which may vary of the video signal to synchronize the audio to the video signal, the alteration of the alpha length of the audio signal causing pitch artifacts, and pitch correction means for correcting said pitch artifacts occasioned during the alteration of the alpha length of the audio signal.

30. The apparatus of claim 29 characterized in that the video signal has fields and said means for altering the alpha length of the audio signal included adding and/or subtracting fields from the video signal.

31. The apparatus of claim 29 wherein the signals are part of an MPEG coded system including an automatic reference signal and characterized in the the means for determining the time differential includes the automatic reference signal.

32. The apparatus of claim 31 characterized in that the automatic reference signal includes a system clock reference and/or presentation time stamps.

33. The apparatus of claim 29 characterized in that the said means for altering the alpha length of the audio signal includes a continuously variable audio delay.

34. The apparatus of claim 33 wherein the audio signal is advanced or delayed in respect to the video signal and characterized in the the audio is sampled, and said continuously variable audio delays adds samples to the audio signal to slow down advanced audio and/or deletes samples from the audio signal to speed up delayed audio.

* * * * *

UNITED STATES PATENT AND TRADEMARK OFFICE
CERTIFICATE OF CORRECTION

PATENT NO. : 5,920,842
DATED : July 6, 1999
INVENTOR(S) : Cooper et al.

Page 1 of 1

It is certified that error appears in the above-identified patent and that said Letters Patent is hereby corrected as shown below:

Column 28,
Line 34, delete "apparatus" and insert -- method --.
Line 36, delete "means for".
Line 37, delete "means for".
Line 46, delete "apparatus" and insert -- method --.
Line 48, delete "means for".
Line 49, delete "means for".
Line 50, delete "apparatus" and insert -- method --.
Line 51, delete "means for".
Line 54, delete "apparatus" and insert -- method --.
Line 55, delete "means for".
Line 59, delete "apparatus" and insert -- method --.
Line 60, delete "means for".
Line 61, delete "for".
Line 62, delete "apparatus" and insert -- method --.

Column 30,
Line 8, delete "A method" and insert -- Apparatus --.
Line 10, insert -- a timing control circuit for --.

Signed and Sealed this

Twenty-seventh Day of November, 2001

*Attest:*

*Attesting Officer*

NICHOLAS P. GODICI
*Acting Director of the United States Patent and Trademark Office*